United States Patent [19]
Gray et al.

[11] Patent Number: 5,273,680
[45] Date of Patent: Dec. 28, 1993

[54] FLUORINATED OLIGOPHENYLS AND THEIR USE IN LIQUID CRYSTAL MATERIALS

[75] Inventors: George W. Gray, Cottingham; Michael Hird, Hull; David Lacey, Hull; Kenneth J. Toyne, Hull, all of Great Britain; Volker Reiffenrath, Rossdorf, Fed. Rep. of Germany; Andreas Wächtler, Griesheim, Fed. Rep. of Germany; Joachim Krause, Dieburg, Fed. Rep. of Germany; Ulrich Finkenzeller, Plankstadt, Fed. Rep. of Germany; Thomas Geelhaar, Mainz, Fed. Rep. of Germany

[73] Assignee: Merck Patent Gesellschaft mit beschränkter Haftung, Darmstadt, Fed. Rep. of Germany

[21] Appl. No.: 846,750

[22] PCT Filed: Aug. 13, 1988

[86] PCT No.: PCT/EP88/00724

§ 371 Date: Mar. 8, 1989

§ 102(e) Date: Mar. 8, 1989

[87] PCT Pub. No.: WO89/02425

PCT Pub. Date: Mar. 23, 1989

Related U.S. Application Data

[63] Continuation of Ser. No. 350,474, May 8, 1989, abandoned.

[30] Foreign Application Priority Data

Mar. 10, 1988 [DE] Fed. Rep. of Germany ....... 3807862
Mar. 10, 1988 [DE] Fed. Rep. of Germany ....... 3807956
Mar. 16, 1988 [GB] United Kingdom ................ 8806220

[51] Int. Cl.$^5$ .................. C09K 19/12; C09K 19/20; C09K 19/52; G02F 1/13
[52] U.S. Cl. ................. 252/299.66; 252/299.67; 252/299.01; 252/299.6; 359/103
[58] Field of Search ............. 252/299.66, 299.67, 252/299.01

[56] References Cited

U.S. PATENT DOCUMENTS

| | | | |
|---|---|---|---|
| 4,368,135 | 1/1983 | Osman | 252/299.63 |
| 4,415,470 | 11/1983 | Eidenschink et al. | 252/299.63 |
| 4,514,317 | 4/1985 | Tuong et al. | 252/299.62 |
| 4,545,922 | 10/1985 | Eidenschink et al. | 252/299.63 |
| 4,551,264 | 11/1985 | Eidenschink et al. | 252/299.63 |
| 4,594,465 | 6/1986 | Chan et al. | 568/642 |

(List continued on next page.)

FOREIGN PATENT DOCUMENTS

| | | |
|---|---|---|
| 0051738 | 3/1981 | European Pat. Off. |
| 0133489 | 7/1984 | European Pat. Off. |
| 2939782 | 4/1981 | Fed. Rep. of Germany ............ 252/299.65 |
| 2198743 | 6/1988 | United Kingdom ........... 252/299.65 |
| WO88/02130 | 3/1988 | World Int. Prop. O. |

Primary Examiner—Robert L. Stoll
Assistant Examiner—C. Harris
Attorney, Agent, or Firm—Millen, White, Zelano, & Branigan

[57] ABSTRACT

This invention relates to fluorinated oligophenyls of formula (I), in which a is 0 or 1 and in which the terminal substituents $R^1$, $R^2$ and $R^3$ are each independently an alkyl or alkenyl residue each with up to 15 C atoms, optionally substituted by CN or by at least one halogen atom, and wherein one or more non adjacent $CH_2$ groups of these residues may be replaced by —O—, —S—, —CO—, —O—CO—, —CO—O—, —O—CO—O— or —C≡C—, one of the residues $R^1$ and $R^2$ may also denote a group of formula (II), any one of the following pairs of lateral substituents are both fluorine: (A, B), (C, D), (D, E), (C, E), (B, C), (D, J), (D, K), (A, C), (C, J), (C', D'), (D', E), (D', A), (C', E), (C', A), (D', J'), (D', K'), (C', J'), (B, G), (A, G), all of the other lateral substituents being hydrogen or fluorine, and to their use as components of liquid crystalline compositions.

14 Claims, 8 Drawing Sheets

U.S. PATENT DOCUMENTS

| | | | |
|---|---|---|---|
| 4,602,851 | 7/1986 | Jenner et al. | 359/163 X |
| 4,606,845 | 8/1986 | Romer et al. | 252/299.63 |
| 4,637,897 | 1/1987 | Kelly | 252/299.63 |
| 4,659,502 | 4/1987 | Fearon et al. | 252/299.61 |
| 4,664,840 | 5/1987 | Osman | 252/299.63 |
| 4,710,315 | 12/1987 | Schad et al. | 252/299.63 |
| 4,724,097 | 2/1988 | Romer et al. | 252/299.63 |
| 4,726,911 | 2/1988 | Krause et al. | 252/299.61 |
| 4,776,973 | 10/1988 | Bofinger et al. | 252/299.61 |
| 4,808,333 | 2/1989 | Huyhn-ba et al. | 252/299.66 |
| 4,820,839 | 4/1989 | Krause et al. | 544/316 |
| 4,834,904 | 5/1989 | Krause et al. | 252/299.01 |
| 4,846,998 | 7/1989 | Pohl et al. | 252/299.63 |
| 4,897,216 | 1/1990 | Reiffenrath et al. | 252/299.63 |
| 4,925,278 | 5/1990 | Buchecker et al. | 350/350.5 |
| 4,925,590 | 5/1990 | Reiffenrath et al. | 252/299.61 |
| 5,037,576 | 8/1991 | Gray et al. | 252/299.63 |
| 5,087,764 | 2/1992 | Reiffenrath et al. | 568/656 |
| 5,133,896 | 7/1992 | Coates et al. | 252/299.65 |
| 5,147,577 | 9/1992 | Gray et al. | 252/299.62 |

ROUTE 1

ROUTE 2

ROUTE 3

ROUTE 4

ROUTE 5

ROUTE 6 AND 7

ROUTE 8

ROUTE 9

ROUTE 10

FLUORINATED OLIGOPHENYLS AND THEIR USE IN LIQUID CRYSTAL MATERIALS

This application is a continuation of application Ser. No. 07/350,474 filed May 8, 1989, now abandoned.

This invention relates to laterally fluorinated oligophenyls and their use in liquid crystal materials.

Liquid crystal materials are well known, and generally exploit the electro-optical switching properties of the nematic (N) or smectic, especially chiral smectic C ($S_C^*$) or smectic I ($S_I^*$), phases the asterisk denoted a chiral phase. They are used widely in electrooptical display devices.

Such materials are generally mixtures of compounds selected so that the mixture shows desirable properties. In particular such properties include:

(i) a broad temperature range over which a suitable liquid crystal phase, e.g. $S_A$, $S_C$, $S_C^*$, $S_I S^*_I$ or N persists, this range preferably including room temperature (ca. 20° C.)

(ii) low viscosity (iii) ease of manufacture (iv) good electro-optical response (v) In the case of compounds or mixtures which show an $S_C$ phase, miscibility with one or more optically active compounds, i.e. which contain an asymmetrically substituted carbon atom, to form a helical chiral phase having a long pitch and a high spontaneous polarisation coefficient $P_S$. It is also useful if the compound or mixture shows an $S_A$ phase at a higher temperature than its $S_C$ phase to assist in aligning the $S_C$ phase with the electrodes of a liquid crystal electrooptical device.

Fluorinated terphenyls are known for use in liquid crystal materials. For example:

EP-A-8430494.3 describes the preparation and use of monofluorinated terphenyls of general formula:

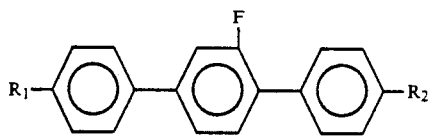

where $R_1$ and $R_2$ are independently alkyl or alkoxy, in nematic liquid crystal materials. GB-A-8725928 and WO/07890 disclose the use of these monofluorinated terphenyls in $S_C^*$ mixtures.

EP-A-0084194 contains a wholly speculative references to laterally difluorinated terphenyls, including a theoretical reference to the compound:

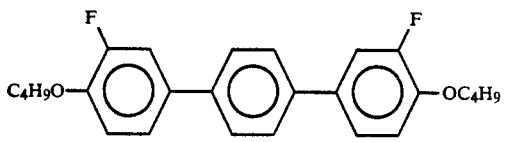

for use in nematic mixture. PCT/EP87/00515 which at the date of this patent application was unpublished, contains a speculative general formula which would include difluorophenyls, and also refers specifically to the two compounds:

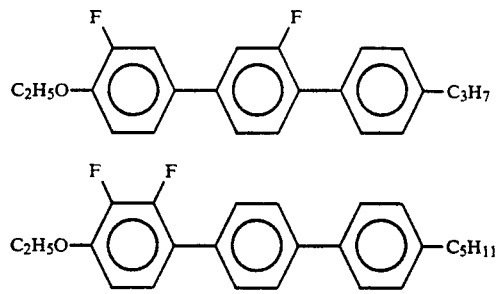

used exclusively in nematic liquid crystal mixtures.

This invention seeks to identify other useful difluorinated terphenyls, and in particular to investigate their use in smectic liquid crystal materials.

According to the invention fluorinated derivatives of bi-, p-ter- or p-quaterphenyl are provided of the formula I

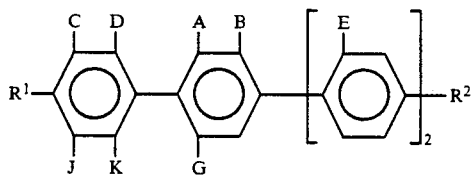

in which a is 0 or 1, and in which the terminal substituents $R^1$, $R^2$ and $R_3$ are each independently an alkyl or alkenyl residue each with up to 15 C atoms, optionally substituted by CN or by at least one halogen atom, and wherein one or more non-adjacent $CH_2$ groups of these residues may be replaced by —O—, —S—, —CO—, —O—CO—, —CO—O—, —O—CO—O— or —C≡C—, one of the residues $R_1$ and $R_2$ may also denote a group of the formula,

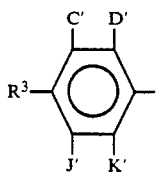

any one of the following pairs of lateral substituents are both fluorine: (A, B), (C, D), (D, E), (C, E), (B, C), (D, J), (D, K), (A, C), (C, J), (C', D'), (D', E), (D', A), (C', E), (C', A), (D', J'), (D', K'), (C', J'), (B, G), (A, G), all of the other lateral substituents being hydrogen or fluorine.

The structural preferences discussed below are inter alia on the basis of usefulness in liquid crystal mixtures, and/or ease of preparation.

Preferred overall structures for difluorinated terphenyls of formula I are those of the part formulae I, 1 to I, 6

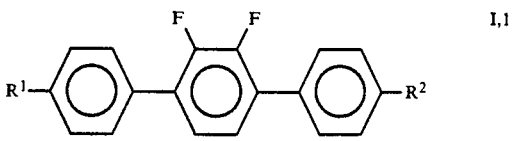

I,1

-continued

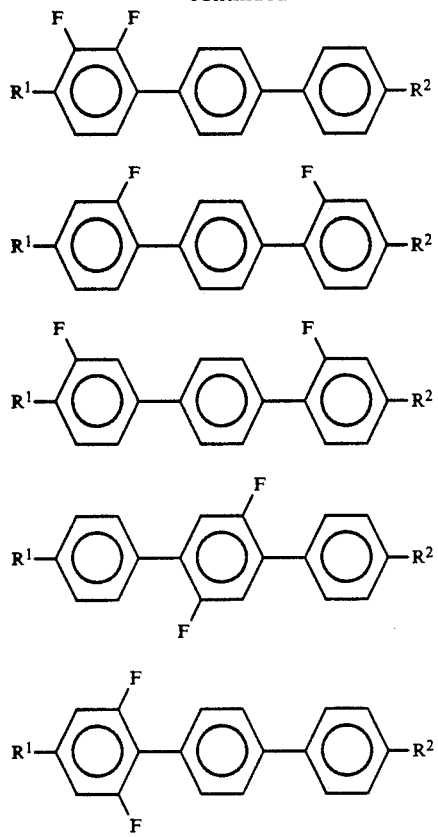

Preferred overall structures for trifluorinated terphenyls of formula I are those of part formulae I,7 to I,12:

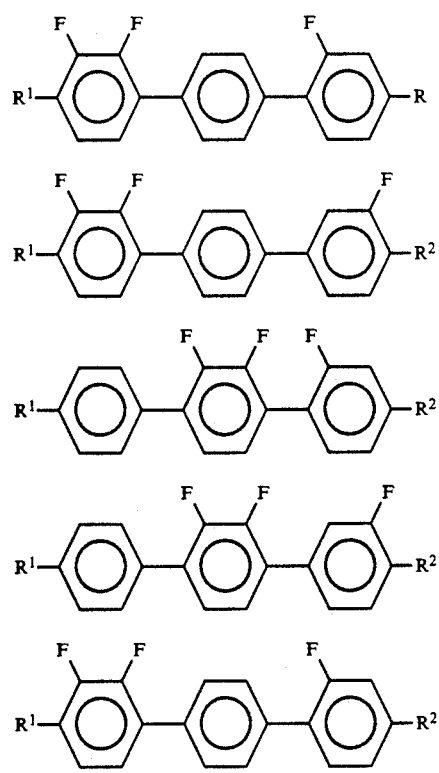

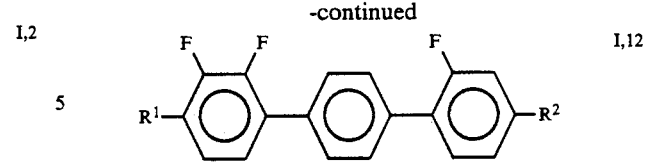

Compositions exhibiting smectic C phases which contain compounds of the formula I wherein a is 0 are particularly preferred. Preferred overall structures of difluorinated biphenyls of formula I (a=0) are those of part formulae I,13 to I,19:

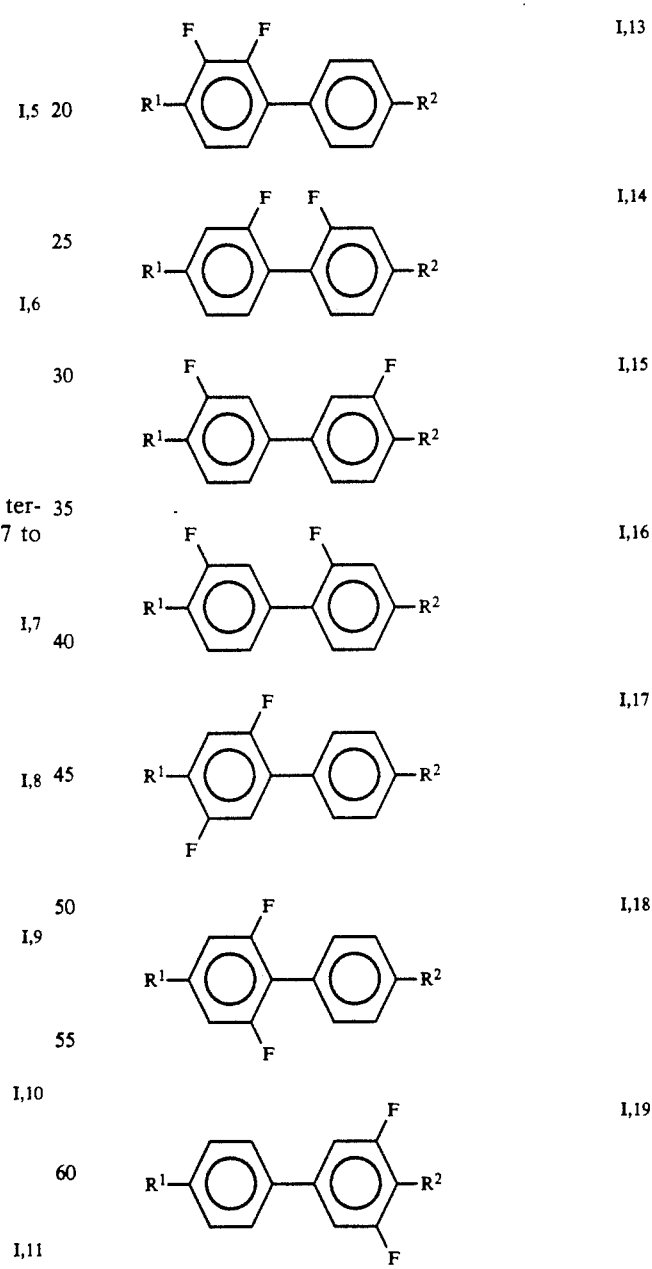

For the sake of simplicity in the following Phe denotes a 1,4-phenylen group, PheF a group of the formula

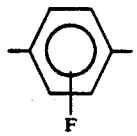

and PheF$_2$ a group of the formula

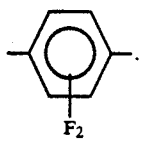

The compounds of the formula I can be used as components of liquid crystal mixtures, preferably for displays based on the principle of the twisted cell, the guest-host-effect, the effect of the deformation of aligned phases or the effect of dynamic scattering. Compounds of the formula I with a negative anisotropy of the dielectric constants ($\Delta\epsilon = \epsilon_{\parallel} - \epsilon_{\perp} <$ wherein $\epsilon_{\parallel}$ denotes the dielectric constant parallel to the axis of the molecule and $\epsilon_{\perp}$ perpendicular to this axis) are aligned perpendicular to an applied electric field.

This effect is previously known and is used to control the optical transparency in various liquid crystal display elements, for example, in display elements using the effect of dynamic scattering or the effect of the deformation of aligned phases or of the guest-host interaction.

The ECB effect (electrically controlled birefringence) or DAP effect (deformation of aligned phases) was described first by M. F. Schieckel and K. Fahrenschon, Appl. Phys. Lett. (1971), 3912.

The work of J. Robert and F. Clerc (SID 80, Digest. Techn. Papers (1980) 80) showed that liquid crystalline phases have to exhibit large values of the relation of the elastic constants $K_3/K_1$, large values of the optical anisotropy $\Delta n$ and values between $-0.5$ and $-5.0$ for the dielectric anisotropy, in order to used in high informative display elements based on the ECB effect.

Electrooptical display elements based on the ECB effect exhibit a homeotropic alignment which means the liquid crystalline phase has a negative dielectric anisotropy. The lc-phase used in electro-optical display elements based on this effect have to suffice many requirements. They have to be chemical stable against humidity and air, physical stable against heat, radiation of infra-red, visible and ultra-violet liquid and against A.C.- and D.C.-fields.

In addition, technical applicable lc-phases are required to have a liquid crystalline mesophase in a suitable temperature range and a low viscosity.

There is, however, a great need for liquid crystalline phases with suitable mesophase ranges, high values of $K_3/K_1$, high optical anisotropy $\Delta n$, negative dielectric anisotropy and high stability.

According to another important aspect of the invention the compounds of the formula I are highly suitable as components of chirally tilted smectic phases.

Chiral tilted smectic liquid crystalline phases with ferro-electric properties can be prepared by adding a suitable chiral dopant to a base-mixture which exhibits one or more tilted smectic phases (L. A. Veresnev et al., Mol. Cryst. Liq. Cryst. 89, 327 (1982); H. R. Brand et al., J. Physique 44 (lett.), L-771 (1983).

Such phases can be used as dielectrics for displays based on the SSFLC-technology described by Clark and Lagerwall (N. A. Clark and S. T. Lagerwall, Appl. Phys. Lett. 36, 889 (1980); U.S. Pat. No. 4,367,924).

The invention was based on the object of discovering fluorinated oligophenyls of the formula I which are suitable as components of liquid crystalline mixtures. Particularly liquid crystalline mixtures with a broad mesophase range and a comparable low viscosity are preparable with their aid.

In addition, the compounds of the formula I are suitable as components for chiral tilted smectic liquid crystalline phases.

The compounds of the formula I have a wide range of application. Depending on the choice of the substituents, these compounds can be used as the base materials from which liquid crystalline mixtures are composed up to 50%; however, it is also possible for compounds of the formula I to be added to liquid crystalline base materials of other classes of compounds in order to influence the dielectric and/or optical anisotropy and/or for the viscosity and/or the spontaneous polarization and/or the mesophase range and/or the tilt angle and/or the pitch of such a dielectric. The compounds of the formula I are furthermore suitable as intermediates for the preparation of other substances, which are useful as components of liquid crystalline dielectrics.

The compounds of the formula I are colourless in the pure state. They are very stable towards chemicals, heat and light.

The invention thus relates to compounds of the formula I, wherein a is 1, in particular to compounds of the formulae I, 1 to I, 6. Furthermore the invention relates to compounds of the formula I'

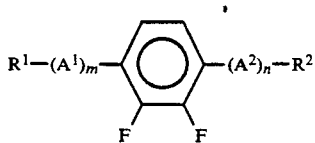

wherein $A^1$ and $A^2$ are each independently a 1,4-phenylene group optionally substituted by one to four fluorines, $R^1$ and $R^2$ are each independently an alkyl or alkenyl residue each with up to 15 C atoms, optionally substituted by CN or by at least one halogen atom, and wherein one or more non-adjacent $CH_2$ groups of these residues may be replaced by —O—, —S—, —CO—, —O—CO—, —CO—O—, —O—CO—O— or —C≡C—, m is 0 or 1, n is 1, 2 or 3, and the sum of m and n is 2 or 3.

In addition, the invention relates to a liquid crystalline composition with at least two liquid crystalline components wherein at least one component is a compound of the formula I, wherein a is 1 and to liquid crystalline composition, exhibiting a smectic C phase wherein at least one component is a compound of the formula I wherein a denotes 0 or 1.

Furthermore, the invention relates to liquid crystalline display elements which contain such compositions.

Above and below $R^1$, $R^2$, $R^3$, $A^1$, $A^2$, m and n have the meaning given, unless expressly indicated otherwise.

The compounds of the formula I accordingly include preferred compounds with three rings of the part formulae Ia to Id:

$R^1$—Phe—Phe—PheF$_2$—$R^2$     Ia $R^1$—Phe—PheF$_2$—Phe—$R^2$     Ib $R^1$—PheF—Phe—PheF—$R^2$     Ic $R^1$—PheF—PheF—Phe—$R^2$     Id compounds with four rings of the part formulae Ie to Ij $R^1$—Phe—Phe—Phe—PheF$_2$—$R^2$     Ie $R^1$—Phe—Phe—PheF$_2$—Phe—$R^2$     If $R^1$—PheF—Phe—Phe—PheF—$R^2$     Ig $R^1$—PheF—Phe—PheF—Phe—$R^2$     Ih $R^1$—PheF—PheF—Phe—Phe—$R^2$     Ii $R^1$—PhePheF—PheF—Phe—$R^2$     Ij and compounds with two rings of the part formula Ik $R^1$—PheF$_2$—Phe—$R^2$     Ik.

Above and below $R^1$ and $R^2$ denote preferably alkyl or alkoxy. In the compounds of the formula I' $A^1$ and $A^2$ are Phe, PheF and PheF$_2$, preferably the compounds of the formula I' do not exhibit more than one group PheF$_2$.

n preferably is 1, 2 or 3, particularly 1.
m preferably is 0.

Above and below $R^1$ and $R^2$ each preferably denote alkyl with preferably 1 to 13 C atoms, particularly 3 to 12 C atoms.

The compounds of the formula I wherein $R^1$, $R^2$ and $R^3$ have 1 to 7 C atoms, preferably 1 to 5 C atoms, are particularly suitable for liquid crystalline phase used in displays based on the ECB effect.

The compounds of the formula I, wherein $R^1$, $R^2$ and $R^3$ have 2 to 15 C atoms, preferably 2 to 12 C atoms, particularly 3 to 9 C atoms, are suitable for liquid crystalline phases exhibiting ferroelectric properties.

In the residues $R^1$, $R^2$ and $R^3$ one or two CH$_2$-groups may be replaced by —O—, —S—, —CO—, —O—CO—, —CO—O—, —O—CO—O— or —C≡C—.

Preferably only one CH$_2$ group is replaced, particularly preferred by —O—, —O—CO—, —CO—O— or —C≡C—.

If $R^1$, $R^2$ and $R^3$ each are an alkyl radical wherein one ("alkoxy" or "oxaalkyl") or two ("alkoxyalkoxy" or "dioxaalkyl") nonadjacent CH$_2$ groups may be replaced by —O—, these radicals can be straight-chain or branched. Preferably, it is straight-chain and has 2, 3, 4, 5, 6, 7, 8, 9 or 10 C atoms and is accordingly preferably ethyl, propyl, butyl, pentyl, hexyl, heptyl, octyl, nonyl or decyl, ethoxy, propoxy, butoxy, pentoxy, hexoxy, heptoxy, nonoxy, decyloxy, also methyl, undecyl, dodecyl, tridecyl, tetradecyl, methoxy, undecyloxy, dodecyloxy, tridecyloxy or tetradecyloxy.

Oxaalkyl is preferably straight chain 2-oxapropyl (=methoxymethyl), 2- (=ethoxymethyl) or 3-oxabutyl (=2-methoxyethyl), 2-, 3- oder 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl, 1,3-dioxabutyl (=methoxymethoxy), 1,3-, 1,4-, 2,4-dioxapentyl, 1,3-, 1,4-, 1,5-, 2,4-, 2,5- or 3,5-dioxahexyl, 1,3-, 1,4-, 1,5-, 1,6-, 2,4-, 2,5-, 2,6-, 3,5-, 3,6- or 4.6-dioxaheptyl.

If $R^1$, $R^2$ and $R^3$ are each an alkyl radical wherein one CH$_2$ group is replaced by —S—, this thiaalkyl radical can be straight-chain or branched. Preferably, it is straight chain and denotes 2-thiapropyl, 2- or 3-thiabutyl, 2-, 3- or 4-thiapentyl, 2-, 3-, 4- or 5-thiahexyl, 2-, 3-, 4-, 5- or 6-thiaheptyl, 2-, 3-, 4-, 5-, 6- or 7-thiaoctyl, 2-, 3-, 4-, 5-, 6-, 7- or 8-thianonyl or 2-, 3-, 4-, 5-, 6-, 7-, 8- or 9-thiadecyl.

Thiaalkyl radicals are particularly preferred wherein the CH$_2$ group adjacent to a ring Phe, PheF or PheF$_2$ is replaced by —S—. Accordingly, it denotes methylthio, ethylthio, propylthio, butylthio, pentylthio, hexylthio, heptylthio, octylthio, nonylthio or decylthio.

If $R^1$, $R^2$ and $R^3$ each are an alkenyl radical, it can be straight-chain or branched. Preferably, it is straight-chain and has 2 to 10 C atoms. Accordingly, it is vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

If $R^1$, $R^2$ and $R^3$ are each an alkyl radical wherein one CH$_2$ group is replaced by —O—CO— or —CO—O—, it can be straight-chain or branched. Preferably, it is straight-chain and has 2 to 6 C atoms. It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

Compounds of the formula I with branched terminal groups $R^1$, $R^2$ and $R^3$ can occasionally be of importance because of the improved solubility in the costumary liquid crystal base materials, but in particular as chiral doping substances if they are optically active. Smectic compounds of this type are suitable as components for ferro-electric materials.

Branched groups of this type as a rule do not contain more than one chain branching. Preferred branched chain radicals $R^1$, $R^2$ or $R^3$ are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy, 1-methylheptoxy, 2-oxa-3-methylbutyl, 3-oxa-4-methylpentyl, 4-methylhexyl, 2-nonyl, 2-decyl, 2-dodecyl, 6-methyloctoxy, 6-methyloctanoyloxy, 5-methylheptyloxycarbonyl, 2-methylbutyryloxy, 3-methylvaleryloxy, 4-methylhexanoyloxy, 2-chlorpropionyloxy, 2-chlor-3-methylbutyryloxy, 2-chlor-4-methylvaleryloxy, 2-chlor-3-methylvaleryloxy, 2-methyl-3-oxapentyl, 2-methyl-3-oxahexyl, 2-fluoro-3-methylvaleryloxy, 2-fluoro-3-methylbutoxy. If $R^1$, $R^2$ and $R^3$ are each an alkyl radical wherein two or more CH₂ groups are replaced by —O— and/or —CO—O—, it can be straight-chain or branched. Preferably, it is branched and has 3 to 12 C atoms. It is accordingly preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)-butyl, 5,5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, 5,5-bis-(ethoxycarbonyl)-pentyl.

Compounds of the formula I wherein the terminal groups $R^1$, $R^2$ and/or $R^3$ are suitable for poly-condensation reactions are useful for the preparation of liquid crystalline polycondensates. Formula I includes both the racemates of these compounds and the optical antipodes, as well as mixtures thereof.

The compounds of the formula I are prepared by methods which are known per se, such as are described in the literature (for example in the standard works, such as Houben-Weyl, Methoden der Organischen Chemie [Methods of Organic Chemistry], Georg Thieme Verlag, Stuttgart), and in particular under reaction conditions which are known and suitable for the reactions mentioned. Variants which are known per se and are not mentioned in more detail here can also be used in this connection.

If desired, the starting materials can also be formed in situ, such that they are not isolated from the reaction mixture but are immediately reacted further to give the compounds of the formula I. The compounds of the formula I' can be prepared from 1,2-difluorobenzene as startig material.

This is deprotonated using a procedure known from M. A. Roe et al. (J. Chem. Soc. Chem. Comm. 22, 582 (1965)) and reacted with the corresponding electrophilic reagent.

This reaction sequence can be carried out a second time with the so obtained 1-substituted-2,3-difluorobenzene. Accordingly, 1,4-disubstituted-2,3-difluorobenzene derivatives of the formula I can be obtained.

1,2-Difluorobenzene or 1-substituted-2,3-difluorbenzene, respectively, is reacted in an inert solvent as, for example, in an ether as diethylether, tetrahydrofuran, dimethoxyethane, tert.-butylmethylether or dioxane or in a hydrocarbon as hexane, heptane, cyclohexane, benzene, tolene or a mixture of these solvents, optionally with a complexing agent as, for example, tetramethylethylendiamin (TMEDA), hexamethylphosphoric acid triamide (HMPTA), or N,N-dimethylpropylene-urea (DMPU) with an organometallic reagent as, for example, phenyllithium, n-, sec-, or tert.-butyllithium, lithium tetramethylpiperidinidi at temperatures of $-120°$ C. to $+50°$ C. preferably $-78°$ C. to $0°$ C.

The 2,3-difluorphenyllithium compounds are reacted with the corresponding electrophilic reagents at $-120°$ C. to $0°$ C., preferably at $0°$ C. Suitable electrophilic reagents are aldehydes, ketones, nitriles, epoxides, carboxylic acid derivatives as, for example esters, anhydrides or carboxylic halides, halogenformic acid esters or carbondioxide. Particularly suitable electrophilic reagents are derivatives of cyclohexanone.

For the reaction with aliphatic halides the lithium derivatives have to be transmetallized to the potassium derivatives using potassium tert. butylate at temperatures of $-80°$ C. to $-120°$ C.

For the reaction with aromatic halides the lithium derivatives are, for example, transmetallized to the zinc-, boron- or titanium-derivatives which are suitable for cross-coppling reactions under transition-metal catalysis.

BRIEF DESCRIPTION OF DRAWINGS

Terphenyls of formula I may for example be prepared using general routes 1 to 10 shown schematically in FIGS. 1 to 8 of the accompanying drawings.

Although illustrated therein for cases in which $R_1$ and $R_2$ are alkyl or alkoxy, it will be understood that perfluoroalkyl or perfluoroalkoxy analogues may be made by analogous routes. Other methods of making these compounds will be apparent to those skilled in the art. Terphenyls of formula I in which one of the pairs (D, K or C, J) are both fluorine may for example be made using the starting difluorophenol of route 9, or the known 1,3-difluoro-2-amino phenol, and adding appropriately 4-substituted phenyl rings to such precursors, using for example routes which couple these rings via known phenylboronic acids.

Figure 1:
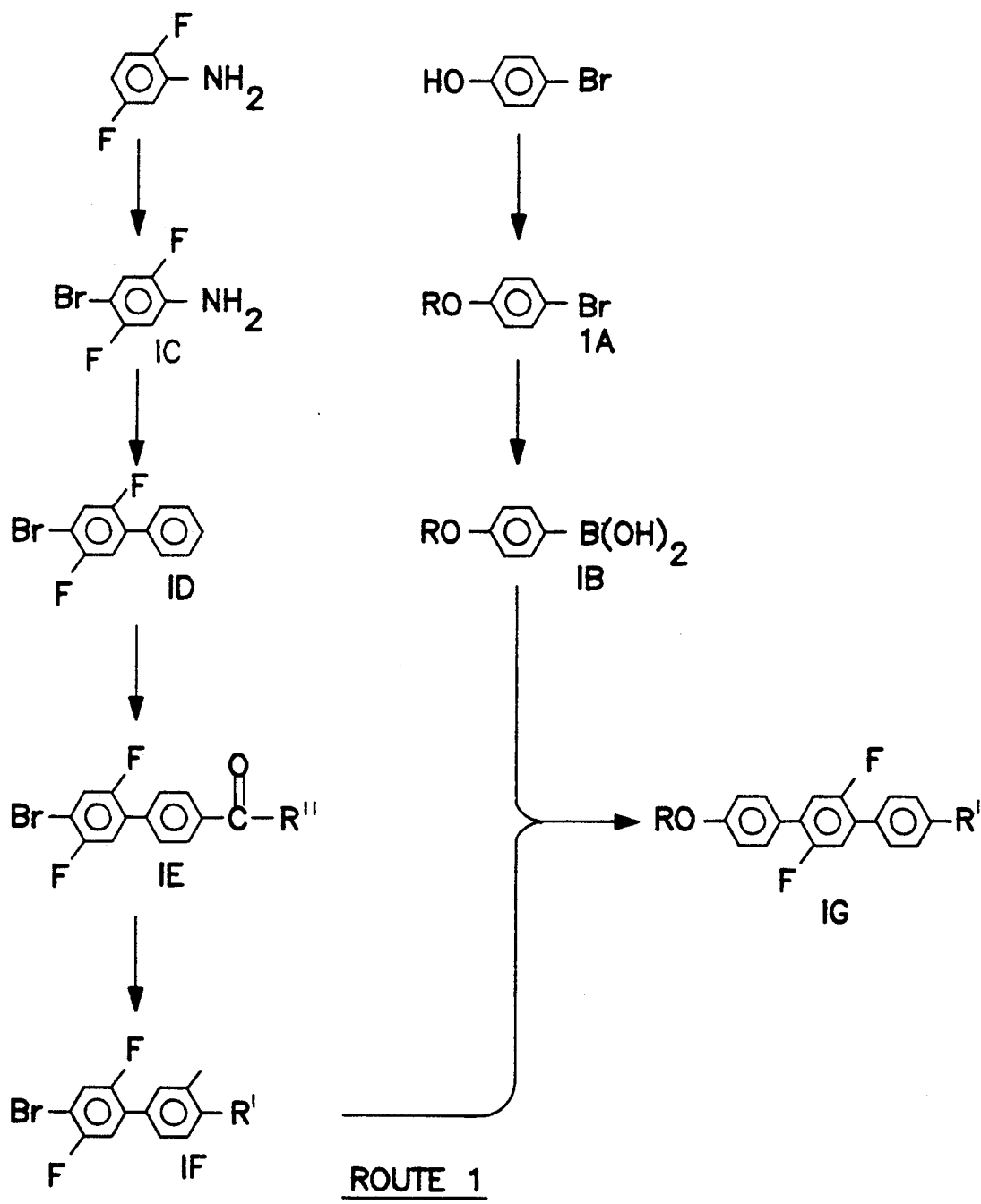

Route 1, exemplified in FIG. 1, discloses the production of 4'-n-hexyloxy-4''-n-pentyl-2',5'-difluoro-p-terphenyl, from either of 4-n-hexyloxybromobenzene or 4-amino-2,5-difluorobromobenzene.

Figure 2:
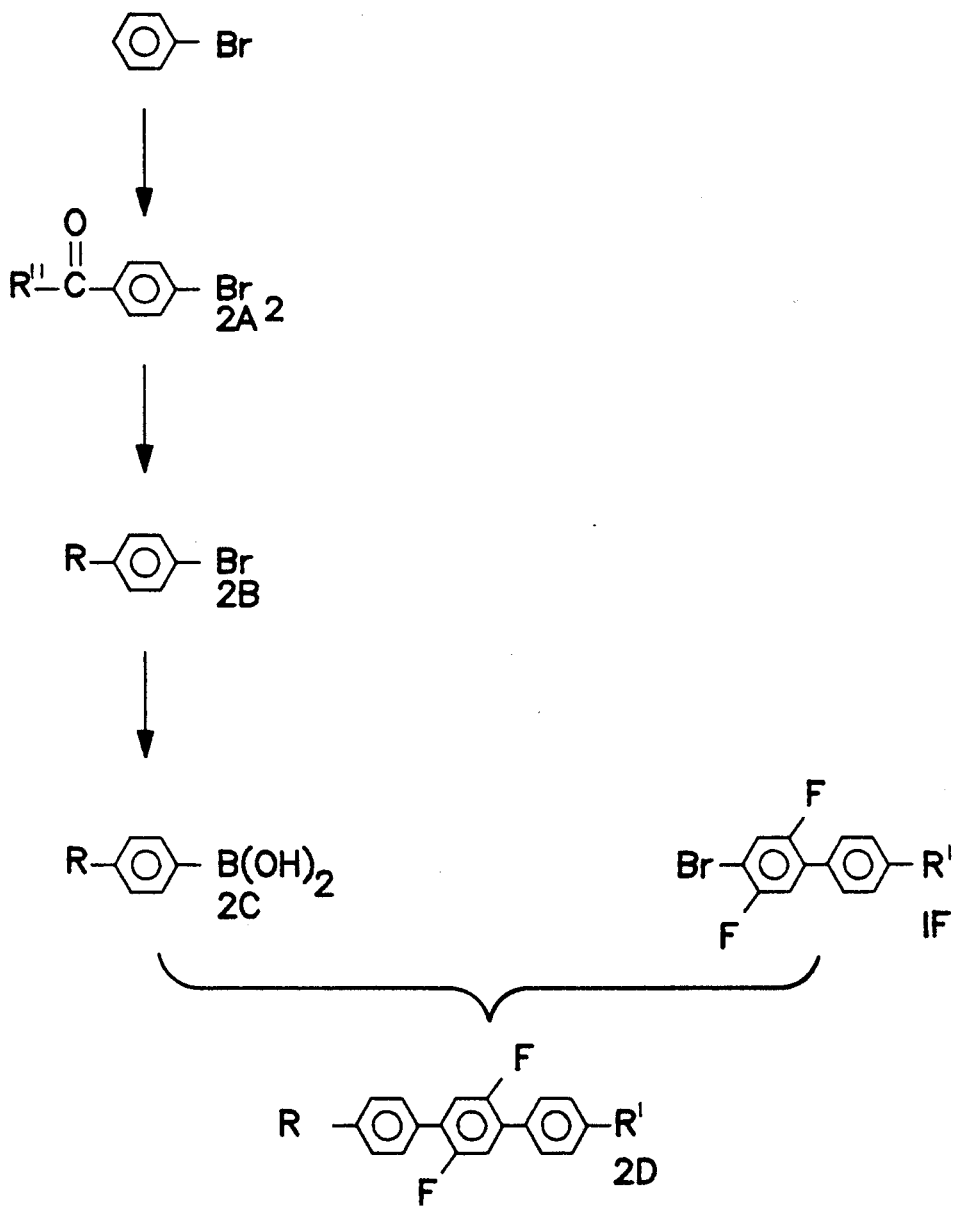

Route 2, exemplified in FIG. 2, discloses the production of 4,4''-di-n-pentyl-2',5'-difluoro-p-terphenyl from 4-pentanoyl-bromobenzene.

Figure 3:
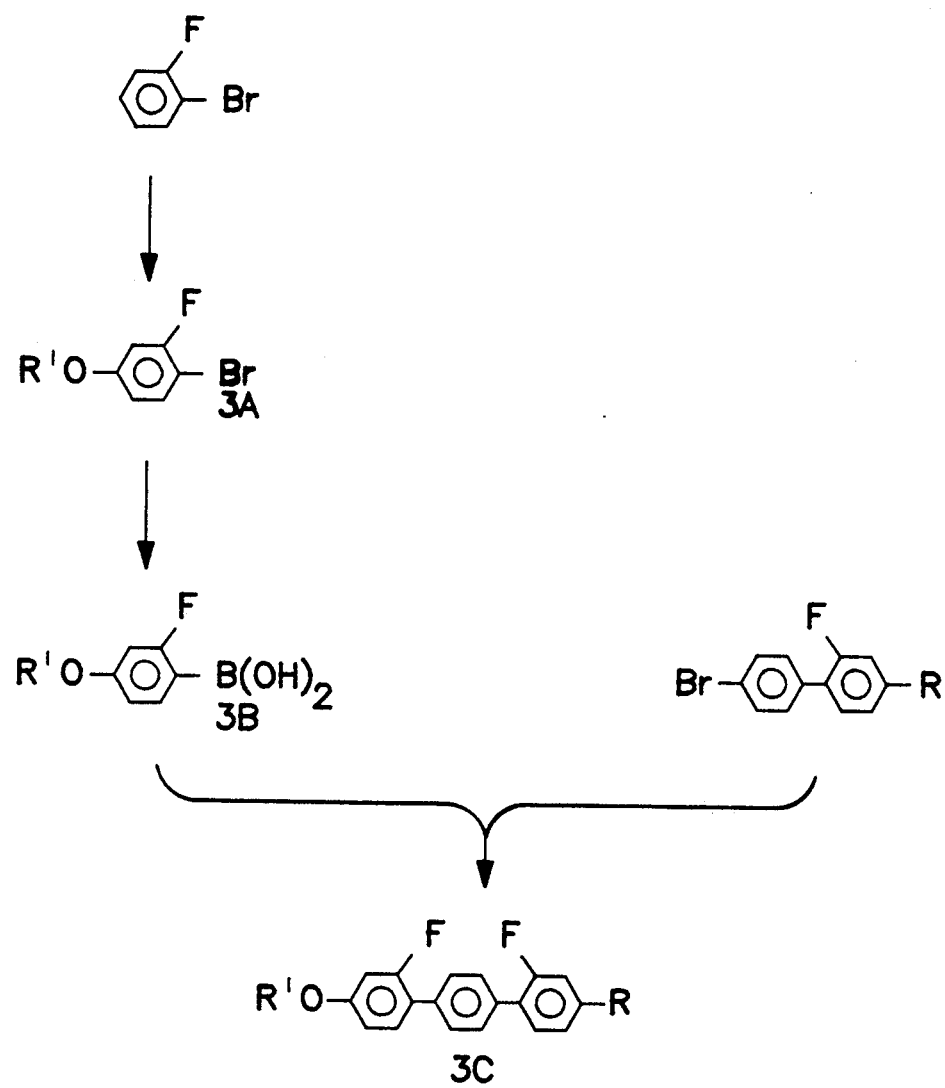

Route 3, as exemplified in FIG. 3, discloses preparation of 4-n-hexyloxy-4''-n-pentyl-2,2''-difluoro-p-terphenyl from 4-n-hexyloxy-2-fluorobromobenzene.

Figure 4:
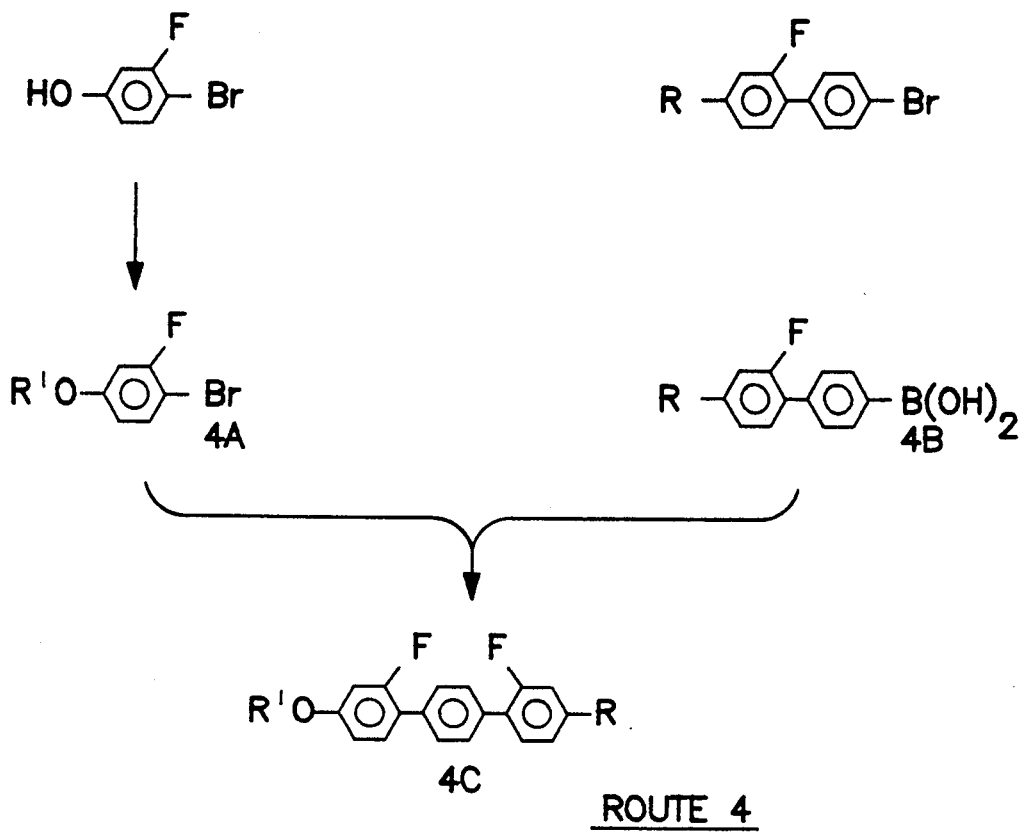
Figure 4:
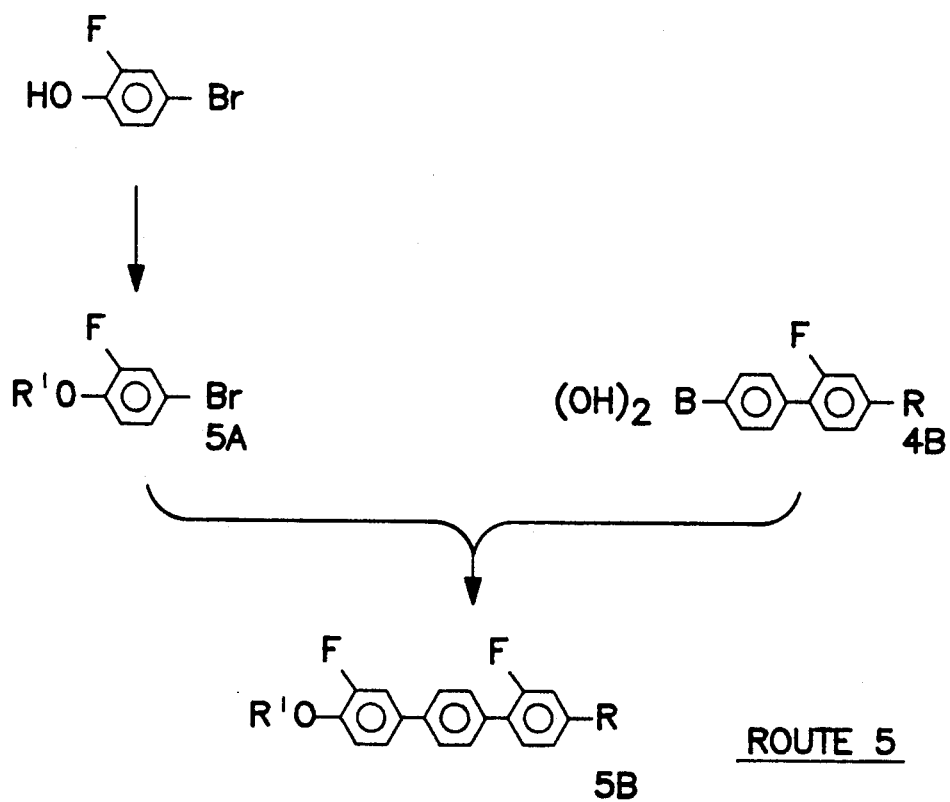

Routes 4 and 5, exemplified in FIG. 4, disclose the preparation of, respectively, 4-n-octyloxy-4''-pentyl-2,2''-difluoro-p-terphenyl from 4-n-octyloxy-2-fluorobromobenzene or 4'-n-pentyl-2'-flurorbiphenyl-4-ylboronic acid and 4-n-hexyloxy-4''-n-pentyl-3,2''-difluoro-p-terphenyl or 4'-n-pentyl-2'-flurorbiphenyl-4-ylboronic acid.

Figure 5:
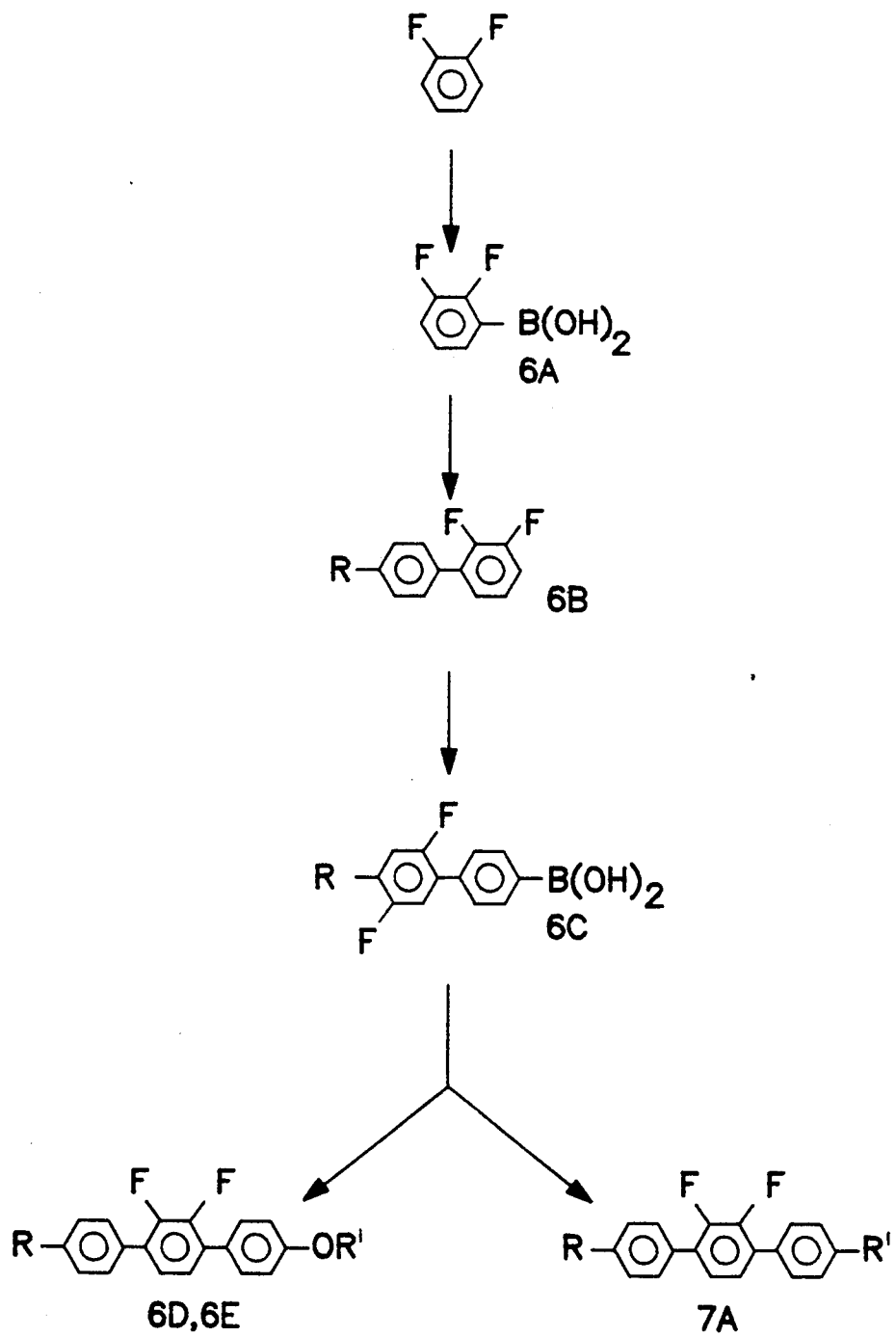

Routes 6 and 7 exemplified in FIG. 5 disclose the production of 4-n-hexyloxy-4''-pentyl-2',3'-difluoro-p-terphenyl, 4,-n-octyloxy-4''-n-pentyl-2'3'-p-terphenyl and 4,4''-di-n-pentyl-2',3'-difluoro-p-terphenyl from 2,3-difluorophenylboronic acid.

Figure 6:
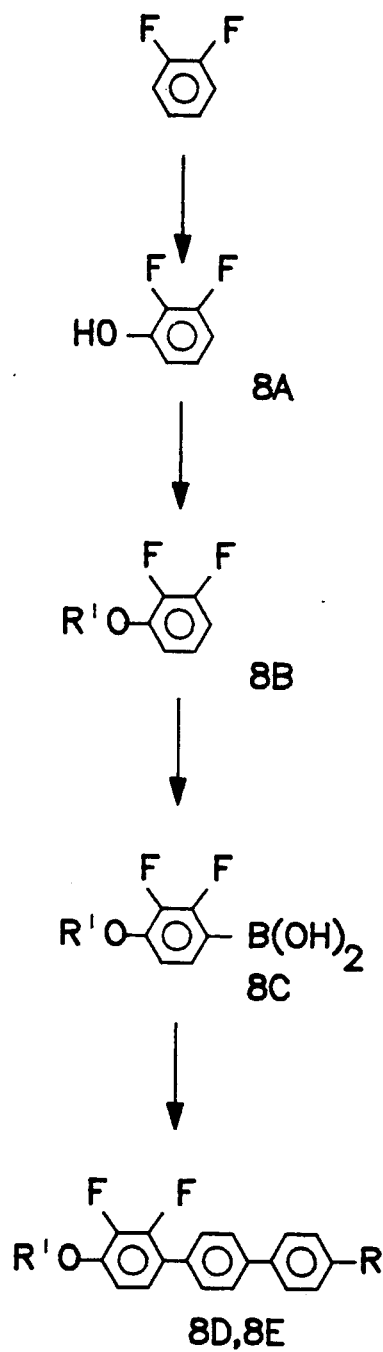

Route 8, exemplified in FIG. 6, discloses the production of 4-n-hexyloxy-4''-n-pentyl-2,3-difluoro-p-terphenyl and 4-n-octyloxy-2,3-difluorophenylboronic acid from 2,3-difluorophenol.

Figure 7:
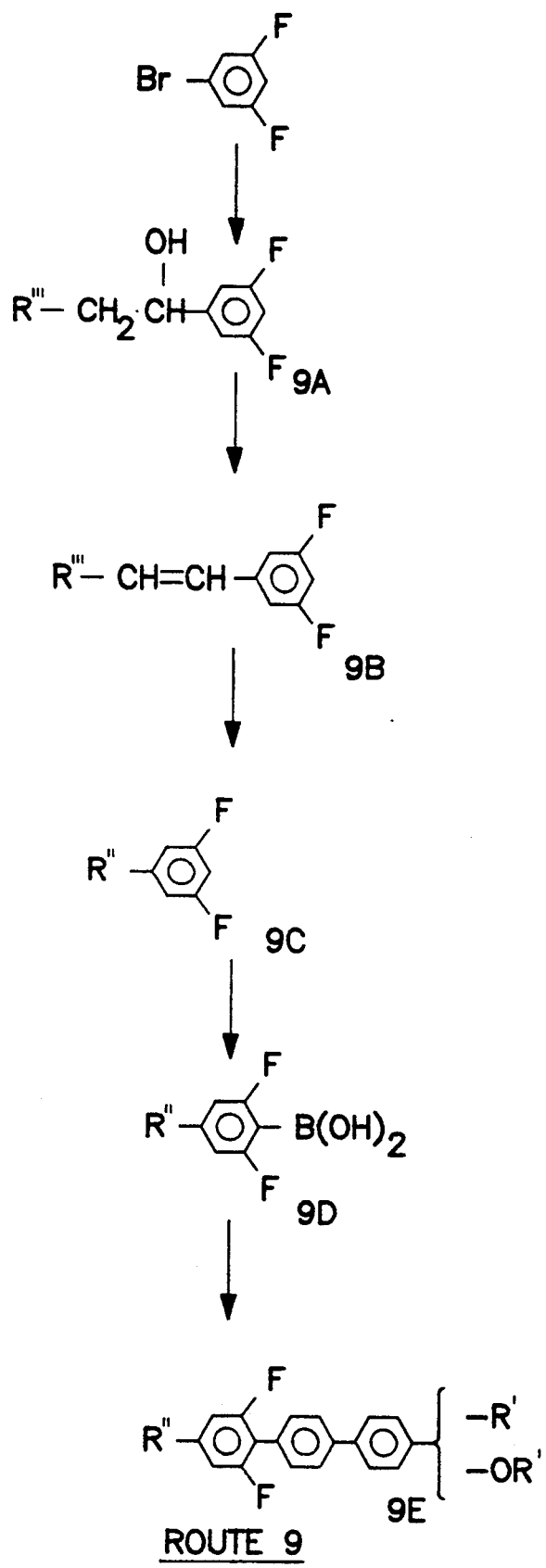

Route 9, exemplified in FIG. 7, discloses the production of 3-pentyl-4''-hexyloxy-2,6-difluoro-p-terphenyl from 1,3-difluoro-5-(1-hydroxypentyl)-benzene.

Figure 8:
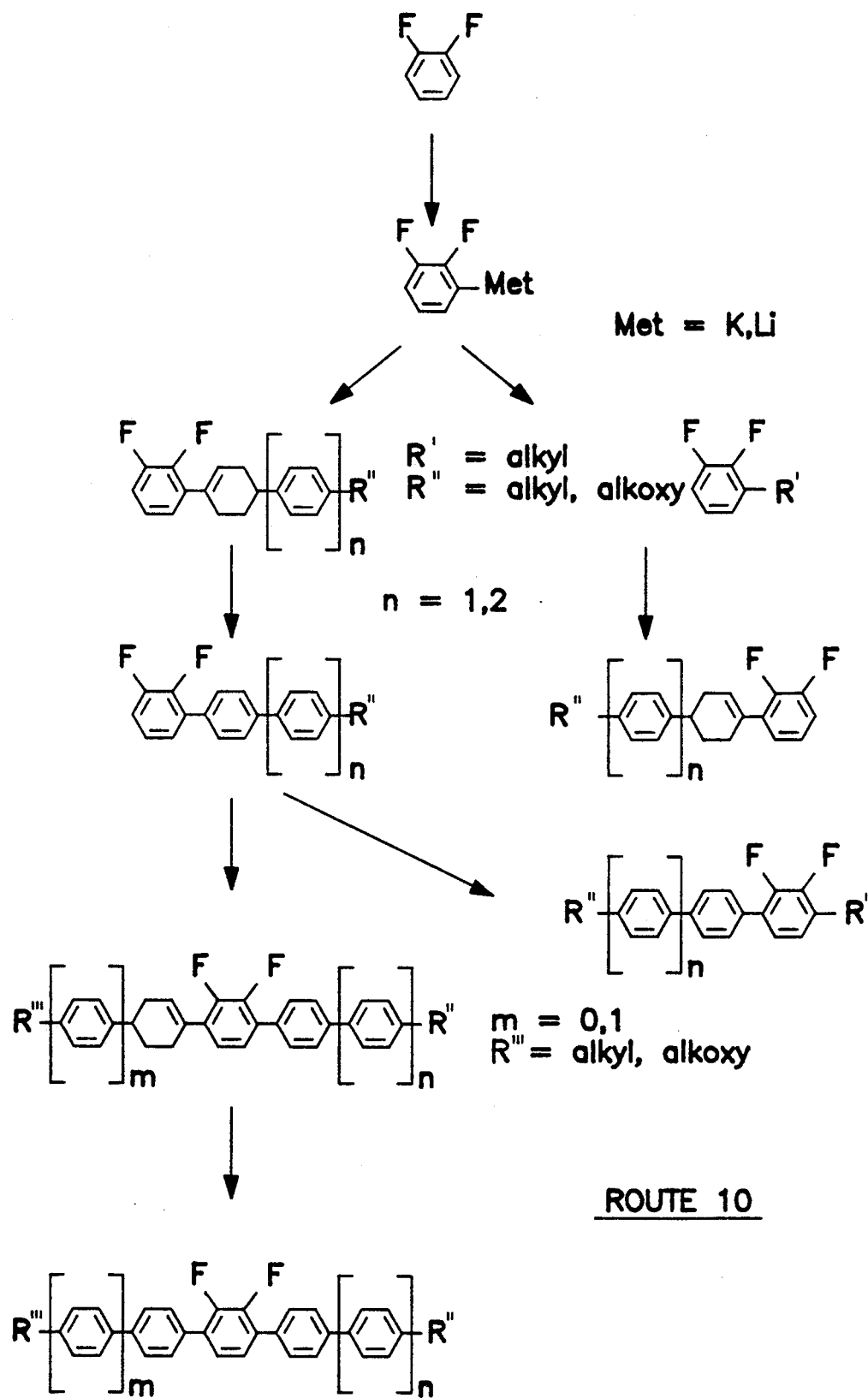

Route 10, exemplified in FIG. 8, discloses the production of 4-n-alkyl-1-(2,3-difluorophenyl)-cyclohex-1-ene 1,2-difluorobenzene.

Difluorobiphenyls of formula I may be prepared by modifications of routes 1 to 9 in which the various intermediates formed in these routes are coupled with phenyls, e.g.

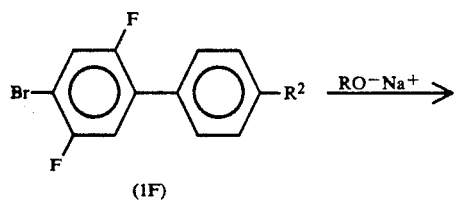
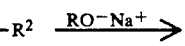

(1F)

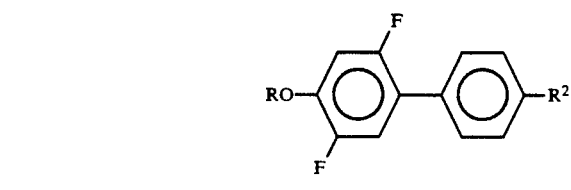
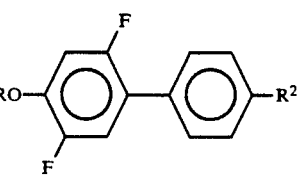

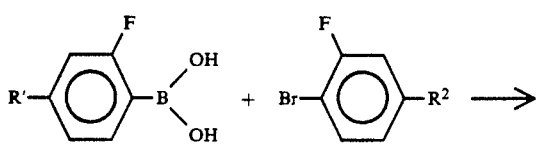

(5B)  (5A)

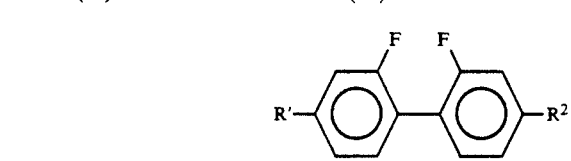

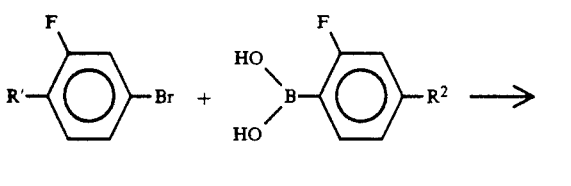

(5A)  (5B)

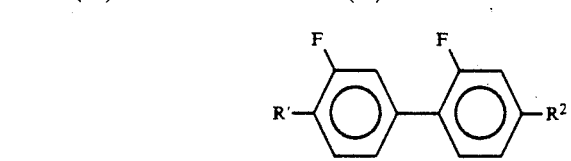

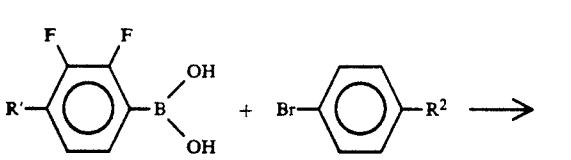

(8C)

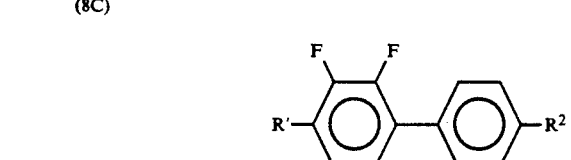

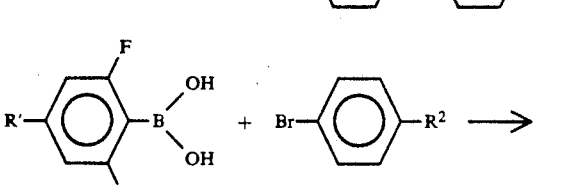

(9D)

-continued

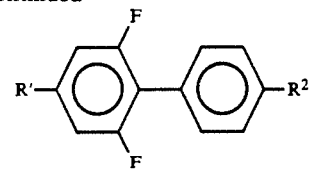

Trifluoroterphenyls may also be prepared by modification of routes 1 to 9, e.g. by coupling the intermediates formed, e.g.

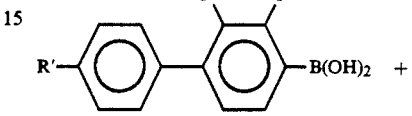

(6C)

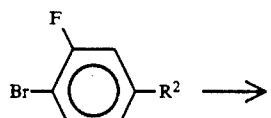

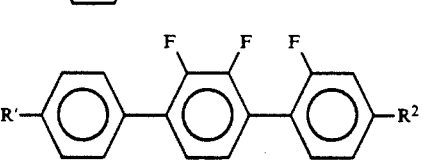

Compounds of formula I often show nematic or smectic C phases which persist over a broad temperature range and are useful constituents of liquid crystal mixtures.

Therefore according to a second aspect of the invention there is provided a liquid crystal material, being a mixture of compounds, at least one of which is a p-bi-, p-ter- or p-quaterphenyl of formula I, preferably one selected of the part formulae I,1 to I,19.

The liquid crystalline phases according to the invention consist of 2 to 25, preferably 3 to 15, components, at least one of which is a compound of the formula I.

The other constituents are preferably chosen from nematic, smectic, nematogenic of smectogenic substances, in particular the known substances, from the classes of azoxybenzenes, benzylideneanilines, biphenyls, p-terphenyls, phenyl or cyclohexyl benzoates, phenyl or cyclohexyl cyclohexane carboxylates, phenylcyclohexanes, cyclohexylbiphenyles, cyclohexylcyclohexanes, cyclohexylnaphthalenes, 1,4-bis-cyclohexylbenzenes, 4,4'-bis-cyclohexylbiphenyls, phenyl- or cyclohexylpyrimidines, phenyl- or cyclohexyldithianes, phenyl- or cyclohexyldioxanes, 1,2-bis-phenylethanes, 1,2-bis-cyclohexylethane, 1-phenyl-2-cyclohexylethanes, optionally halogenated stilbenes, benzylphenyl ethers, tolanes and substituted cinnamic acids.

Important compounds which are possible constituents of liquid crystalline mixtures according to the invention can be characterized by the formula III

R'—L—G—E—R"

wherein

L and E are each an unsubstituted or laterally fluoro or cyano substituted carbo- or heterocyclic ring system chosen from the group comprising 1,4-di-substituted benzene or cyclohexane rings, 1,4-di-substituted 1-cyanocyclohexane rings, 4,4'-di-substituted biphenyl, phenylcyclohexyl or bicyclohexyl systems, 2,5-disubstituted pyrimidine, pyridine and 1,3-dioxane rings, 2,6-disubstituted naphthalene, di- and tetrahydronaphthalene, quinoline and tetrahydroquinazoline, G is —CH=CH—, —CH=CY—, —C≡C—, —CO—O—, —CO—S—, —CH=N—, —N(O)=N—, —CH=N(O)—, —CH₂CH₂—, —CH₂—O—, —CH₂—S—, —COO—Phe—COO— or a single bond, Y is halogen, preferably chlorine or —CN, R' and R" are each alkyl, alkoxy, alkanoyloxy, alkoxycarbonyl or alkoxycarbonyloxy with up to 18, preferably up to 10 C atoms, it also being possible for one $CH_2$ group nonadjacent to an oxygen to be replaced by —O—, —CH=CH— or —C≡C—, or one of these radicals R' and R" may also be —CN, —NO₂, —CF₃, —NCS, —F, —Cl, or —Br.

In the most of these compounds R' and R" are different for one another, one of these radicals usually being an alkyl or alkoxy group. However, other variants of the substituents envisaged can also be used. Many such substances or mixtures thereof are commercially available. All of these substances can be prepared by methods which are known from the literature.

The liquid crystalline mixtures according to the invention are prepared in a manner which is customary per se. As a rule, the components are dissolved in one another, preferably at elevated temperature.

The liquid crystalline mixtures according to the invention can be modified by suitable additives such that they can be used in all the types of liquid crystal display elements disclosed to date.

Such additives are known to the expert and are described in detail in the literature. For example, it is possible to add conductive salts, preferably ethyl-dimethyl-dodecyl-ammonium 4-hexyloxybenzoate, tetrabutylammonium tetraphenylboranate or complex salts or crown ethers (compare, for example, I. Haller et al., Mol.Cryst.Liq. Cryst. Volume 24, pages 249-258 (1973) for improving the conductivity, dichroic dyestuffs for the production of coloured guest-host systems or substances for changing the dielectric anisotropy, the viscosity and/or the orientation of the nematic phases. Such substances are described, for example, in German Offenlegungsschrift 2,209,127, 2,240,863, 2,321,632, 2,338,281, 2,450,088, 2,637,430, 2,853,728 and 2,902,177.

When the liquid crystal material is a nematic liquid crystal material, the other constituents of the material may be selected from a wide variety of compounds which are known to be useful constituents of nematic liquid crystal materials, for example those structural types of the part formulae 2.1 to 2.6 where $R_a$ and $R_b$ are independently alkyl or alkoxy:

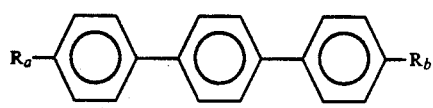

2.1

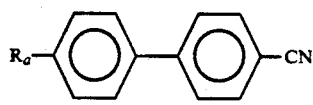

2.2

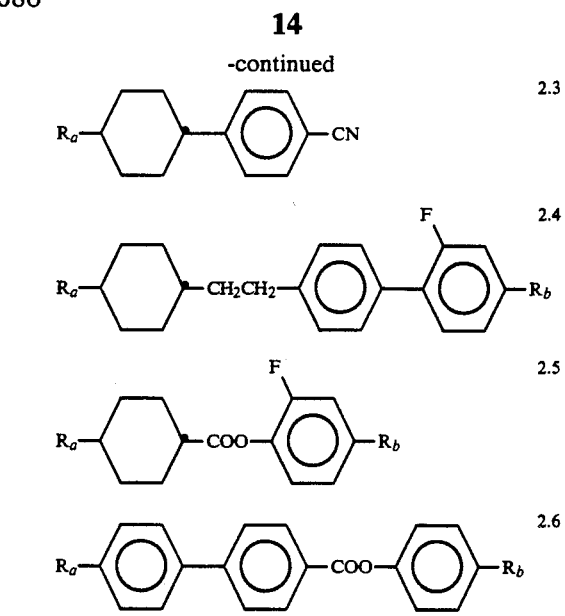

Generally a nematic liquid crystal material of this aspect of the invention contains up to about 25% by weight of a terphenyl of formula I. For twisted nematic (TN), Freedericksz effect, cholesteric to nematic phase change effect devices, the bulk of the material may usefully comprise compounds selected from formulae 2.1 to 2.6. If a cholesteric phase is required, one or more of the alkyl groups $R_a$ or $R_b$ may contain an asymmetric carbon atom, e.g. in a 2-methylbutyl group.

Certain terphenyls of formula I have been found to be particularly useful in liquid crystal materials which employ the electrically controlled birefringence (ECB) effect. In such materials one or more terphenyls of formula I may constitute up to about 50% by weight, typically up to about 25%. The bulk of such a mixture may usefully comprise compounds of the part formulae 3.1 to 3.6, in which $R_a$ and $R_b$ may be alkyl or alkoxy:

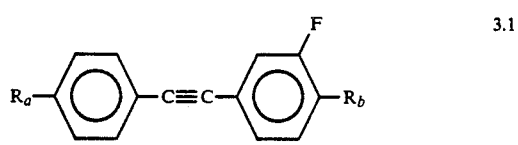

3.1

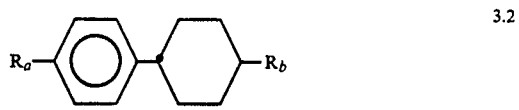

3.2

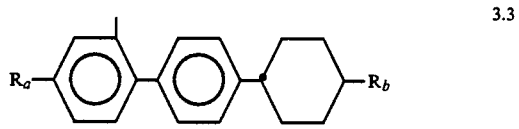

3.3

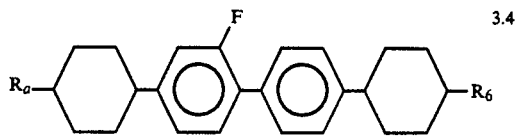

3.4

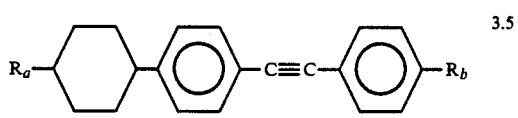

3.5

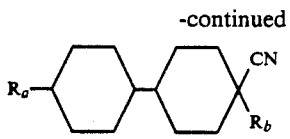
3.6

Certain bi- and terphenyls of formula I have been found to be useful components of liquid crystal materials which exploit the ferroelectric properties of the $S_C^*$ phase. Certain terphenyls of formula I show smectic C phases which persist over a broad temperature range. Therefore this invention provides a liquid crystal material which shows an $S_C$ phase which is a mixture containing one or more bi- or terphenyls of formula I, and which may consist wholly of two or more bi- and/or terphenyls of formula I. To provide an $S_C^*$ phase, one of the constituents of this mixture must contain an asymmetric carbon atom, and this constituent may itself be a bi- or terphenyl of formula I, but it is preferably a compound not of formula 1.

Mixtures with a $S_c$ phase which contain in addition to one or more terphenyls of the formula I one ore more biphenyls of the formula I are particularly preferred.

Such a mixture may usefully contain compounds of the part formulae 4.1 to 4.8, in which $R_a$ and $R_b$ may be alkyl or alkoxy and X denotes O or S, preferably O:

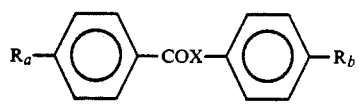
4.1

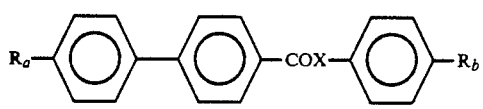
4.2

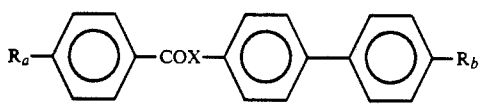
4.3

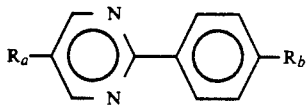
4.4

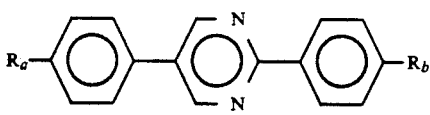
4.5

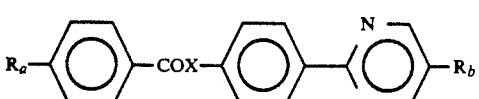
4.6

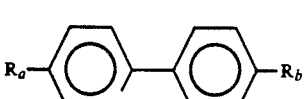
4.7

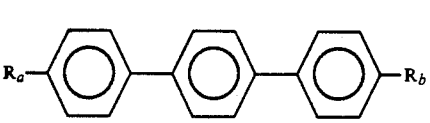
4.8

In the compounds of the formulae 4.1 to 4.8 one 1,4-phenylene group may be substituted by halogen, preferably by fluorine. Preferred fluorinated forms of formulae 4.1 to 4.8 are those of the formulae 4.9 and 4.10:

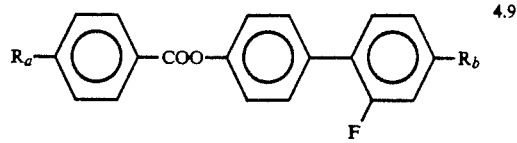
4.9

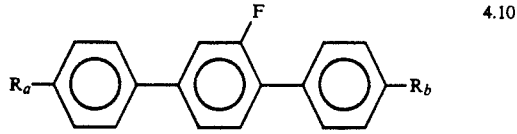
4.10

The smectic phases according to the invention may also contain in addition to the compounds of the formula I and of the formulae 4 a component exhibiting a negative value of the dielectric anisotropy ($\Delta\epsilon \leq -2$), e.g. compounds of the formulae 5.1 to 5.3:

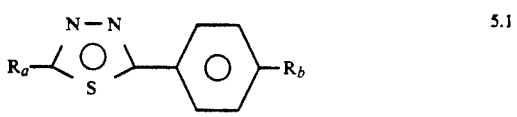
5.1

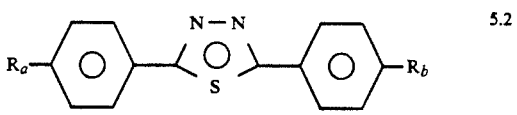
5.2

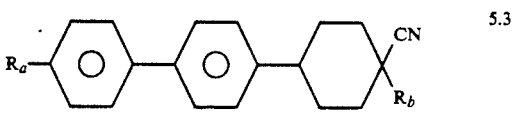
5.3

In $S_C$ and $S_C^*$ mixtures of this aspect of the invention, terphenyls of formulae I,1 to 1,6, especially I,1, I,2 and I,4 are preferred constituents as they show useful $S_C$ phases.

When the $S_C$ or $S_C^*$ material of this aspect of the invention does not consist wholly of bi- or terphenyls of formula I, other constituents are compounds which are known to be useful constituents of $S_C$ and/or $S_C^*$ liquid crystal materials. A useful $S_C^*$ liquid crystal material may comprise a mixture of one or more terphenyls of formula I, plus one or more other compounds which contain an asymmetrically substituted carbon atom.

In an $S_C^*$ mixture of this aspect of the invention, $R_1$ and $R_2$ are preferably of a longer carbon chain length than would be used for nematic materials, for example each preferably contains 5 or more carbon atoms. $R_1$ and $R_2$ are preferably n-alkyl or n-alkoxy in such mixtures.

The discovery that $S_C^*$ mixtures may be prepared using terphenyls of formula I, and their advantages, i.e. good $S_C$ phases and fast switching speeds, are wholly unexpected over the prior art which refers exclusively to nematic or ECB mixtures. Indeed nematic or ECB mixtures are generally designed to exclude compounds which show smectic character.

Preferred compounds containing asymmetric carbon in an $S_C^*$ material of this aspect of the invention include the 1-methylheptyl (2Oct*) esters disclosed in EP-A-0110299, or one or more of the compounds containing a —COO.CH(CN) group disclosed in WO 87/07890 or UK Patent Applications 8729502, 8729503, 8729865 or 8729982.

Derivatives of the optical active lactic acid are disclosed in WO 86/02938 or PCT/GB 87/00132. Optical active derivatives of terpinoids are described in WO 86/04328, naphthoic esters in WO 87/06577, mandelic acid esters in WO 88/02390 and derivatives of optical active amino acids are disclosed in WO 86/02937 or UK Patent Application 86 20 111.

The chiral dopants of the part formulae 6.1 to 6.6, wherein X denotes an alkoxy- or alkylamino-residue, Y denotes H, $CF_3$ or $CH_3$, m is 0 or 1, n is 1 or 2 and p is 0 or 1 are particularly preferred:

6.1

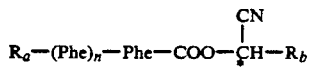

6.2

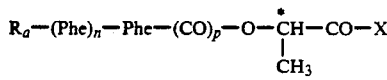

6.3

6.4

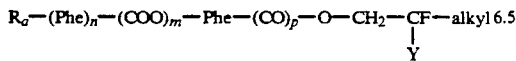

6.5

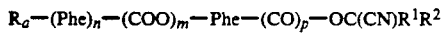

6.6

In the compounds of the formulae 6.1 to 6.6 one or more group Phe may be substituted by fluorine, $R_a$ and $R_b$ are as defined above, $R_b$ being preferably $C_1$-$C_4$ n-alkyl, cycloalkyl or branched alkyl.

$R_a$ in the last-above formulae is preferably $C_5$-$C_{12}$ n-alkyl or n-alkoxy, particularly n-octyloxy. $R_b$ is preferably methyl or a group of general formula:

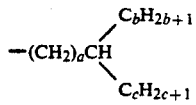

where a is 0 or an integer 1-6, and each of b and c are independently integers 1-6, preferably at least one of b or c being 1. $R_1$ and $R_2$ are each alkyl having a different number of carbon atoms or taken together preferably denote an alicyclic group, for example, of the formula:

When the $S_C$* mixture of this aspect of the invention contains two or more compounds which contain an asymmetric carbon atom, then two or more of these compounds may usefully be of opposite optical handedness, i.e. having (+) and (−) optical rotation or D and L stereoisomerism. In this way the length of the helical $S_C$* pitch may be controlled, and/or a useful $S_A$ phase may be induced, assisting alignment of the liquid crystal material with the electrodes of an electro-optic device.

Generally an $S_C$* mixture of this aspect of the invention contains 1 to 30 weight % of chiral dopant(s). The rest of the mixture may comprise one or more compounds of the formula I, especially of the formulae I,1 to I,6 or of I,13 and I,17 to I,19. The total being 100 weight %. Alternatively the $S_C$* mixture may consist of 1 to 30 weight % of chiral dopant(s), the rest being a mixture of compounds of formula I plus one or more of formulae 4,1 to 4,10 or 5,1 to 5,3 and/or other known smectic C components or other suitable additives. Generally the weight % of the compounds of the formulae 4,1 to 4,10 or 5,1 to 5,3 will not exceed 80% of the mixture.

The liquid crystal materials of this invention may be used in liquid crystal electro-optical display devices of known construction.

The invention will now be illustrated by way of example only with reference to accompanying FIGS. 1-8 which show preparative routes 1-10 referred to above.

The following abbreviations are used:
K = solid crystal
N = nematic liquid crystal
$S_A$ = smectic A liquid crystal
$S_C$ = smectic C liquid crystal
I = isotropic liquid

EXAMPLE 1

Preparation of 4-n-hexyloxy-4''-n-pentyl-2',5'-difluoro-p-terphenyl

1A 4-n-Hexyloxybromobenzene

A solution of 1-bromohexane (60 g) in acetone (150 ml) is added dropwise to a stirred mixture of 4-bromphenol (71 g) and $K_2CO_3$ (120 g) in acetone 600 ml) at room temperature. The stirred mixture is heated under reflux for 43 hrs (i.e. until glc revealed complete reaction). The product is extracted into ether twice, and the combined ethereal extracts are washed with water, 5% NaOH water and dried ($MgSO_4$). The solvent is removed in vacuo and the residue was distilled (bp = 100°-110° C. at 0.1 mm Hg) to yield a colourless liquid.

1B 4-n-Hexyloxyphenylboronic acid

A solution of the Grignard Reagent prepared from 1A (72 g) and Mg (7.75 g) in dry THF 250 ml) is added dropwise to a stirred, cooled (−78° C.) solution of tri-isopropyl borate (109.1 g) in dry THF 40 ml) under dry $N_2$. The stirred mixture is allowed to warm to room temperature overnight and stirred with 10% HCl (320 ml) at room temperature for 1 hr. The product is extracted into ether twice, and the combined etheral extracts are washed with water and dried ($MgSO_4$). Solvent is removed in vacuo to yield a colourless solid, mp = 80°-85° C.

1C 4-Amino-2,5-difluorobromobenzene

N-Bromosuccinimide (42 g) is added in small amounts over 1½ h to a stirred, coold (−10°−0° C.) solution of 2-5-difluoroaniline (30-96 g) in dry $CH_2Cl_2$ (180 ml). The mixture is stirred at 0° C. for 2 h. The red solution is washed with a large amount of water twice, and dried ($MgSO_4$). The solvent is removed in vacuo to yield a red solid, mp = 74°-75° C.

1D 2,5-Difluoro-4-bromobiphenyle

A solution of 1C in dry benzene (200 ml) is added dropwise with stirring, over 1½ h to a stirred, cooled 0° C.) solution of isopentylnitrile (33.6 g) in dry benzene. The mixture is heated under reflux for 1½ hrs and cooled. The product is extracted with ether twice and the combined organic layer is washed successively with water, aqueous sodium hydrogen carbonate, 2M hydrochloric acid, and water, and dried (MgSO₄). The solvent is removed in vacuo and the crude product is steam distilled to give a brown-black solid. This is further purified by column chromatography (silica gel/dichloromethane) to give a dark brown low melting solid.

1E 4'-Pentanoyl-2,5-difluoro-4-bromobiphenyl

AlCl₃ (25.4 g) is ground and added to a stirred, cooled (0° C.) solution valeroyl chloride (34.9 g) in dry dichloromethane (120 ml). A solution of 1D (13.2 g) in dry dichloromethane (120 ml) is added dropwise over 2 h at 0° C. The mixture is stirred at room temperature for 48 h and poured onto crushed ice/conc. HCl. The separated aqueous layer is washed with CH₂Cl₂ twice, the combined organic layers are washed with water, NaHCO₃, and water, and dried (MgSO₄). The solvent is removed in vacuo to yield a dark red oil which was distilled under reduced pressure (0.1 mm Hg, temperature not recorded) to give a low melting red-brown solid which is further purified by column chromatography (silica gel/CH₂Cl₂) to yield a low melting red-brown solid.

1F 4'-n-Pentyl-2,5-difluoro-4-bromobiphenyl

Triethylsilane (7.0 g) is added dropwise over 2 h to a cooled, stirred (0° C.) solution of 1E (8.0 g) in trifluoroacetic acid (40 ml). The reaction mixture is stirred at room temperature overnight and poured into NaHCO₃ solution. The product is extracted into ether twice and the combined ether layers are washed with water and dried (MgSO₄). The solvent was removed in vacuo to yield an orange-brown oil. The crude product is distilled under reduced pressure (short path, 110°–120° C. at 0.01 mm Hg) to give a red oil.

1G
4'-n-Hexyloxy-4"-n-pentyl-2',5'-difluoro-p-terphenyl

A solution of 1B (0.9806 g) in ethanol (15 ml) is added dropwise to a stirred mixture of 1F (1.25 g) and tetrakis (triphenylphosphine) palladium (O) (0.1392 g) in benzene (20 ml) and 2M-Na₂CO₃ (20 ml) at room temperature under dry N₂. The stirred mixture is heated under reflux (90°–95° C.) for 23 h (i.e. until glc analysis confirmed absence of starting materials). The mixture is cooled, optionally stirred with 30% H₂O₂ (2 ml) for 1 h at room temperature. The product is extracted with ether twice and the combined organic extracts are washed with brine and dried (MgSO₄). The solvent is removed in vacuo and the residue is purified by column chromatography (silica gel/petroleum ether (bp 40°–60° C.) - dichloromethane, 3-1) to give a colourless solid which is recrystallised from ethanol to give colourless plates, K 53.0 N 118.0 I.

EXAMPLE 2

Preparation of
4,4"-Di-n-pentyl-2',5'-difluoro-p-terphenyl 2A 4-Pentanoyl-bromobenzene Pentanoyl chloride (50 g) is added dropwise to a stirred, cooled 0° C.) mixture of bromobenzene (150 ml) and aluminum chloride (0.2 g). The mixture is stirred at 0° C. for 1 h, heated at 80° C. for 2 h, cooled and poured into 18% hydrochloric acid. The product is extracted into CHCl₃ twice, the combined organic extracts are washed with water and steam distilled to remove chloroform and the excess of bromobenzene. The product is extracted into chloroform twice, the combined organic phases are washed with water and dried (MgSO₄). The solvent is removed in vacuo and the residue is distilled (bp 180°–184° C. at 20 mm Hg) to yield a colourless solid.

2B 4-n-Pentylbromobenzene

A mixture of 2A (77.1 g), hydrazine hydrate (46.4 g) and KOH (590 g) in diethylene glycol (250 ml) is heated at 130° C. for 2 h, the excess of hydrazine hydrate is distilled off and the temperature is raised to 200° C. for 2 h. The cooled mixture is poured into 18% HCl, the product is extracted into ether twice and the combined ethereal extracts are washed with water and dried (MgSO₄). The solvent is removed in vacuo and the residue is distilled (bp 145°–148° C. at 20 mm Hg) to yield a colourless liquid (58.1 g, 80%).

2C 4-n-Pentylphenylboronic acid

The Grignard Reagent prepared from 2B is convated into the boron compound with tri-isopropylborate in an analogous manner as for 1B described.

The product from 2C is coupled with the product from 1F in an analogous manner as for 1G described to yield 4,4"-di-n-pentyl-2',5'-difluoro-p-terphenyl, K 65.0 N 86.0 I.

EXAMPLE 3

Preparation of
4-n-Hexyloxy-4"-n-pentyl-2,2"-difluoro-p-terphenyl 3A 4-n-Hexyloxy-2-fluorobromobenzene A solution of 1-bromohexane (9.33 g) in acetone (20 ml) is added dropwise to a stirred mixture of 4-bromo-3-fluorophenol (9.00 g) and potassium carbonate (13.5 g) in acetone 75 ml) at room temperature. The stirred mixture is heated under reflux for 21 h (i.e. until glc analysis revealed a complete reaction). The product is extracted into ether twice, and the combined ether extracts are washed with water, 10% sodium hydroxide, water and dried (MgSO₄). The solvent is removed under vacuo and the residue is distilled (bp 100°–105° C. at 0.1 mm Hg) to yield a colourless liquid.

3B 4-Hexyloxy-2-fluorophenylboronic acid

A solution of n-butyllithium (10.0M in hexane, 3.30 ml) is added dropwise to a stirred cooled (−78° C.) solution of 3A (9.0 g) in dry THF (70 ml) under dry N₂. The stirred mixture is maintained under these conditions for 2.5 h and then a cooled solution of tri-isopropylborate (11.28 g) in dry THF (50 ml) is added dropwise at −78° C. The stirred mixture is allowed to warm to room temperature overnight and then stirred for 1 h at room temperature with 10 HCl (50 ml). The product is extracted into ether twice and the combined ethereal extracts are washed with water and dried (MgSO₄). The solvent is removed in vacuo to afford an off-white solid.

3C 4-n-Hexyloxy-4"-n-pentyl-2,2"-difluoro-p-terphenyl

The product from 3B is coupled with 4'-bromo-2-fluoro-4-pentylbiphenyl in an analogous manner as described for 1G.

The crude product is purified by column chromatography (silica gel/petroleum fraction (bp 40°–60° C.) - dichloromethane 3:1) to yield a colourless solid which is recrystallised from ethanol to give colourless waxy plates, K 45.0 N 131.0 I.

EXAMPLE 4

Preparation of
4-n-Octyloxy-4''-pentyl-2,2''-difluoro-p-terphenyl

4A 4-n-Octyloxy-2-fluoro-bromobenzene

The method used is as for 3A

| Quantities | |
|---|---|
| 4-bromo-4-fluorophenol | 6.00 g |
| 1-bromooctane | 7.40 g |
| $K_2CO_3$ | 10.00 g |

Product is distilled under reduced pressure (bp=140°-142° C. at 0.5 mm Hg) to yield a colourless liquid.

4B 4'-n-Pentyl-2'-fluorobiphenyl-4-ylboronic acid

The method is used as for 3B

| Quantities | |
|---|---|
| 3'-bromo-2-fluoro-4-n-pentylbiphenyl | 9.90 g |
| Magnesium | 0.871 g |
| tri-isopropylborate | 11.66 g |

4C 4-n-Octyloxy-4''-pentyl-2,2''-difluoro-p-terphenyl

The method is as for 1G

| Quantities | |
|---|---|
| 4A | 6.00 g |
| 4B | 1.75 g |
| Tetrakis(triphenylphosphine)palladium(0) | 0.2979 g |

Product is purified by column chromatography to give a colourless solid, K 42.5 N 121.5 I.

EXAMPLE 5

Preparation of
4-n-hexyloxy-4''-n-pentyl-3,2''-difluoro-p-terphenyl 4-n-Hexyloxy-3-fluorophenylboronic acid is coupled with 4'-bromo-2-fluoro-4-n-pentylbiphenyl in an analogous manner as described for 1G.

The crude product is purified by column chromatography (silica gel/petroleum fraction (bp 40°-60° C.) - $CH_2Cl_2$ 6:1) to give a colourless solid which was recrystallised from ethanol - ethyl acetate (10:1) to yield colourless plates, K 96.0 $S_C$ 105.5 N 139.0 I.

EXAMPLE 6

Preparation of
4-n-Hexyloxy-4''-n-pentyl-2'3,-difluoro-p-terphenyl

6A 2,3-Difluorophenylboronic acid 1,2-Difluorobenzene is converted to 6A with tri-isopropylborate in an analogous manner as described for 3B.

6B 4-n-Pentyl-2',3'-difluorobiphenyl

The method used is as for 1G.

| Quantities | |
|---|---|
| 1-bromo-4-pentylbenzene | 3.80 g |
| 6A | 3.50 g |
| Tetrakis (triphenylphosphine)palladium (0) | 0.651 g |

Coupling to give biphenyls was found to be faster than for terphenyls so this reaction was complete within 5 h.

The crude product was purified by column chromatography (silica gel/petroleum fraction (bp 40°-60° C.): $CH_2Cl_2$ 3:1) to yield a colourless liquid.

6C 4'-n-Pentyl-2,3-difluorobiphenyl-4-ylboronic acid

The method used is as for 3B.

| Quantities: | |
|---|---|
| 6B | 4.00 g |
| n-butyllithium | 1.50 ml, 10.0 M in hexane |
| tri-isopropylborate | 5.70 g |

6D 4-n-Hexyloxy-4''-pentyl-2',3'-difluoro-p-terphenyl

The method used was as for 1G.

| Quantities: | |
|---|---|
| 1B | 1.30 g |
| 6C | 2.0 g |
| Tetrakis (triphenylphosphine) palladium (0) | 0.312 g |

The crude product was purified by column chromatography (silica gel/petroleum Pro-ition (bp 40°-60° C.): dichloromethane 6:1) to yield a colourless solid which was recrystallised from ethanol to give colourless plates. K53° $S_c$ 65.5° N 149° I The analogous compound 6E:

4-n-octyloxy-4''-n-pentyl-2'3'-p-terphenyl is prepared using an analogous route in which 1-bromo-4-octyloxybenzene is used instead of 1B.

This compound is prepared by the same method as for 1B:

| Quantities: | |
|---|---|
| 4-bromophenol | 64.54 g |
| 1-bromooctane | 60.00 g |
| $K_2CO_3$ | 103.5 g | as a colourless liquid bp=145° C. at 0.1 mm Hg.

In the preparation of 6E the method used is as for 6D.

| Quantities: | |
|---|---|
| 1-bromo-4-octoxybenzene | 1.40 g |
| 6C | 1.90 g |
| Tetrakis (triphenylphosphine) palladium (0) | 0.3102 g |

The crude product is purified by column chromatography (silica gel/petroleum fraction (bp 40°-60° C.) - $CH_2Cl_2$, 5:1) to give a colourless solid which is recrystallised from ethanol - ethyl acetate (4:1) to yield colourless plates, K 48.5 $S_c$ 95.1 N 141.5 I.

EXAMPLE 7

Preparation of 4,4'''-di-n-pentyl-2',3'-difluoro-p-terphenyl

The method used is as for 1G.

| Quantities: | |
|---|---|
| 2B | 1.30 g |
| 6C | 2.10 g |
| Tetrakis (triphenylphosphine) palladium (0) | 0.28 g |

The crude product was purified by column chromatography (silica gel/petroleum fraction (bp 40°–60° C.) - $CH_2Cl_2$, 5:1) to yield a colourless solid which was recrystallised from ethanol to give colourless plates, K 60 N 120 I.

EXAMPLE 8

Preparation of 4-n-hexyloxy-4'''-n-pentyl-2,3-difluoroterphenyl

8A 2,3-Difluorophenol

The method used is a modification of M. F. Hawthorne, J. Org. Chem. (1957), 22, 1001.

| Quantities: | |
|---|---|
| 6A | 4.40 g |
| 10% hydrogen peroxide | 30 ml |
| Yield: off-white solid, mp | 34–36 °C. |

8B 2,3-Difluoro-n-hexyloxybenzene

The method used is as for 3A.

| Quantities: | |
|---|---|
| 8A | 7.00 g |
| 1-bromohexane | 10.72 g |
| $K_2CO_3$ | 17.40 g |

The crude product is distilled (bp 122° C. at 15 mm Hg) to give a colourless liquid.

8C 4-n-Hexyloxy-2,3-difluorophenylboronic acid

The method used is as for 3B.

| Quantities: | |
|---|---|
| 8B | 10.0 g |
| n-butyllithium | 4.70 ml, 10.0 M in hexane |
| Tri-isopropylborate | 17.70 g |

8D 4-n-Hexyloxy-4'''-n-pentyl-2,3-difluoro-p-terphenyl

The method used is as for 1G.

| Quantities: | |
|---|---|
| 4-bromo-4'-pentylbiphenyl | 1.40 g |
| 8C | 1.50 g |
| Tetrakis (triphenylphosphine) palladium (0) | 0.2868 g |

The crude product is purified by column chromatography (silica gel/petroleum fraction (bp 40°–60° C.) - $CH_2Cl_2$, 3:1) to give a colourless solid which is recrystallised from ethanol - ethyl acetate (10:1) as colourless crystals, K 97.5° $S_c$ 145.5° N 166° I.

EXAMPLE 8b

Preparation of 4-n-octyloxy-4'''-n-pentyl-2,3-difluoro-p-terphenyl

This compound is prepared by an analogous route using 1,2-difluoro-3-octoxybenzene instead of 8B. This is prepared using the method as for 3A.

| Quantities: | |
|---|---|
| 8A | 7.00 g |
| 1-bromooctane | 12.55 g |
| $K_2CO_3$ | 17.40 g |

The crude product is distilled (bp 150° C. at 15 mm Hg) to give a colourless liquid.

8E 4-n-Octyloxy-2,3-difluorophenylboronic acid

To prepare 8E using the method as for 8C.

| Quantities: | |
|---|---|
| 1,2-difluoro-3-octoxybenzene | 7.50 g |
| n-butyllithium | 3.10 ml 10.0 M in hexane |
| triisopropylborate | 11.66 g |

To yield a colourless solid.

8F 4-n-Octyloxy-4'''-n-pentyl-2,3-difluoro-p-terphenyl method as for 8D

| Quantities: | |
|---|---|
| 4-bromo-4$^1$-pentylbiphenyl | 1.54 g |
| 2,3-difluoro-4-octoxyphenylboronic acid | 1.75 g |
| Tetrakis (triphenylphosphine) palladium (0) | 0.309 g |

The crude product is purified by column chromatography (silica gel/petroleum fraction (bp 40°–60° C.) - $CH_2Cl_2$, 3:1) to give a colourless solid which is recrystallised from ethanol - ethyl acetate 4:1 to give colourless crystals, K 93.5 $S_c$ 144 $S_A$ 148 N 159 I.

EXAMPLE 9

Preparation of 4,4'''-di-n-pentyl-2,6-difluoro-p-terphenyl 9A 1,3-Difluoro-5-(1-hydroxypentyl)-benzene A solution of pentanal (19.0 g, 0.22 mol) in dry ether (75 ml) is added dropwise to a stirred solution of the Grignard reagent at room temperature, under dry nitrogen, prepared from 1-bromo-3,5-difluoro-benzene (50.2 g, 0.26 mol) and magnesium (7.25 g, 0.30 mol) in dry THF (100 ml). The stirred mixture is heated under reflux for 2 h, cooled and a saturated solution of ammonium chloride (300 ml) is added. The product is extracted into ether (twice), and the combined ethereal extracts are washed with water and dried ($MgSO_4$). The solvent is removed in vacuo to give a pale-orange liquid (51.1 g) which is distilled to yield a colourless liquid. Smaller quantities of crude product are purified by column chromatography (silica gel/dichloromethane) to yield a colourless liquid, bp 90° C. at 0.5 mm Hg.

9B 1,3-Difluoro-5-pent-1-enylbenzene

Phosphorus(v) oxide (64.5 g, 0.45 mol) is added to a stirred solution of compound 9A (35.0 g, 0.175 mol) in dry pentane (150 ml) at room temperature. The mixture is stirred at room temperature overnight (glc analysis revealed absence of starting material) and filtered.

9C 1,3-Difluoro-5-pentylbenzene

5% Palladium-on-charcoal (4.0 g) is added to the above filtrate (i.e. compound 9B in pentane (150 ml)) at room temperature. The stirred mixture is hydrogenated at atmospheric pressure for 4 h (i.e., until glc analysis revealed absence of starting material) and the mixture is filtered. The majority of the pentane is removed in vacuo, and the final amount of pentane is distilled off (760 mm Hg) at 38° C. and the residue was then distilled to yield a colourless liquid, bp: 200° C. at 760 mm Hg

9D 2,6-Difluor-5--pentylphenylboronic acid

A solution of n-butyllithium (10.4M in hexane; 2.70 ml, 0.028 mol) is added dropwise to a stirred, cooled (−78° C.) under dry nitrogen. The stirred mixture is maintained under these conditions for 2.5 h and a previously cooled solution of tri-isopropyl borate (10.22 g, 0.054 mol) in dry THF (50 ml) is added dropwise at −78° C. The stirred mixture was allowed to warm to room temperature overnight and stirred for 1 h with 10% hydrochloride acid (30 ml). The product is extracted into ether (twice), and the combined ethereal extracts are washed with water and dried (MgSO₄). The solvent is removed in vacuo to give a colourless solid, mp: 95°–100° C.

9E 3-pentyl-4'''-hexyloxy-2,6-difluoro-p-terphenyl

The method used is as for 1G.

| Quantities: | |
| --- | --- |
| 4-bromohexoxybiphenyl | 1.30 g |
| 9D | 1.10 g |
| Tetrakis (triphenylphosphine) palladium (0) | 0.157 g |

The crude product is purified by column chromatography (basic aluminia/petroleum fraction (bp 40°–60° C.) with the gradual introduction of dichloromethane) to give a colourless solid which is recrystallised from ethanol to give colourless plates, K 62° N 123° I.

9F 4,4''-dipentyl-2,6-difluoro-p-terphenyl

The method used is as for 1G.

| Quantities: | |
| --- | --- |
| 4-bromo-4'-pentylbiphenyl | 1.40 g |
| 9D | 1.37 g |
| Tetrakis (triphenylphosphine) palladium (0) | 0.157 g |

The crude product is purified by column chromatography (silica gel/petroleum fraction (bp 40°–60° C.) - CH₂Cl₂, 1:1) to give a colourless liquid which contained a solid. The solid is filtered off and washed with petroleum fraction (bp 40°–60° C.). The solvent is removed in vacuo to give a colourless liquid, two impurities are removed by using a Kugelrohr distillation apparatus to give a colourless solid which is recrystallised from ethanol to yield colourless crystals. K 50° N 82° I.

EXAMPLE 10

Preparation of 4,4'''-Di-n-alkyl-2',3'-difluoro-p-terphenyls

10A 4-n-Alkyl-1-(2,3-difluorophenyl)-cyclohex-1-enes

A mixture of 0.3 mol n-butyllithium and n-hexane (188 ml) is added to a cooled (−60° to −70° C.) mixture of 1,2-difluorobenzene (0.3 mol), tetrahydrofuran (THF) (600 ml) and tetramethylethylendiamin (TMEDA, 0.3 mol). The stirred mixture is maintained for 3 h and then a mixture of 4-n-pentylcyclohexanone (0.32 mol) and tetrahydrofuran (100 ml) is added. After usual work-up the residue is solved in toluene (1000 ml) and boiled with p-toluene sulfonic (PTSA) acid in a Dean Starck trapp for 3 hrs. The solvent is removed under vacuo and the residue is distilled to yield 4-n-pentyl-1-(2,3-fluorophenyl)-cyclohex-1-en as a colourless liquid (bp 123° at 0.5 mm Hg).

Analogously are obtained
4-ethyl-1-(2,3-difluorphenyl)-cyclohex-1-ene
4-propyl-1-(2,3-difluorphenyl)-cyclohex-1-ene
4-butyl-1-(2,3-difluorphenyl)-cyclohex-1-ene
4-hexyl-1-(2,3-difluorphenyl)-cyclohex-1-ene
4-heptyl-1-(2,3-difluorphenyl)-cyclohex-1-ene
4-octyl-1-(2,3-difluorphenyl)-cyclohex-1-ene
4-nonyl-1-(2,3-difluorphenyl)-cyclohex-1-ene
4-decyl-1-(2,3-difluorphenyl)-cyclohex-1-ene
4-dodecyl-1-(2,3-difluorphenyl)-cyclohex-1-ene
4-ethoxy-1-(2,3-difluorphenyl)-cyclohex-1-ene
4-propoxy-1-(2,3-difluorphenyl)-cyclohex-1-ene
4-butoxy-1-(2,3-difluorphenyl)-cyclohex-1-ene
4-pentoxy-1-(2,3-difluorphenyl)-cyclohex-1-ene
4-hexoxy-1-(2,3-difluorphenyl)-cyclohex-1-ene
4-heptoxy-1-(2,3-difluorphenyl)-cyclohex-1-ene
4-octoxy-1-(2,3-difluorphenyl)-cyclohex-1-ene
4-nonoxy-1-(2,3-difluorphenyl)-cyclohex-1-ene
4-decoxy-1-(2,3-difluorphenyl)-cyclohex-1-ene
4-undecoxy-1-(2,3-difluorphenyl)-cyclohex-1-ene

10B 4-Alkyl-2',3'-difluorbiphenyles

To a mixture of 0.1 mol 4-pentyl-1-(2,3-difluorphenyl)-cyclohex-1-en and 500 ml toluene is added 0.22 mol 2,3-dichlor-5,6-dicyano-p-benzoquinone (DDQ) and refluxed for 2 h. After usual work-up 2',3'-difluorbiphenyl, bp: 125° C. at 0.5 mm Hg is obtained.

Analogously are obtained:
4-ethyl-2',3'-difluorbiphenyl
4-propyl-2',3'-difluorbiphenyl
4-butyl-2',3'-difluorbiphenyl
4-hexyl-2',3'-difluorbiphenyl
4-heptyl-2',3'-difluorbiphenyl
4-octyl-2',3'-difluorbiphenyl
4-nonyl-2',3'-difluorbiphenyl
4-decyl-2',3'-difluorbiphenyl
4-ethoxy-2',3'-difluorbiphenyl
4-propoxy-2',3'-difluorbiphenyl
4-butoxy-2',3'-difluorbiphenyl
4-pentoxy-2',3'-difluorbiphenyl
4-hexoxy-2',3'-difluorbiphenyl
4-heptoxy-2',3'-difluorbiphenyl
4-octoxy-2',3'-difluorbiphenyl
4-nonoxy-2',3'-difluorbiphenyl
4-decoxy-2',3'-difluorbiphenyl
4-dodecoxy-2',3'-difluorbiphenyl The 4,4'-dialkyl-(or alkoxy)-2,3-difluorobiphenyls are obtained analogously by using alkyl-(or alkoxy)-2,3-difluorobenzene as starting material:

4-octyloxy-4'-pentyl-2,3-difluorobiphenyl
K 14 (N 13.5) I
4-octyloxy-4'-heptyl-2,3-difluorobiphenyl
K 24 (S$_C$6 S$_A$ 13 N 23 ) I
4-nonyloxy-4'-decyl-2,3-difluorobiphenyl
K 47 I
4-ethoxy-4'-pentyl-2,3-difluorobiphenyl
K −10 I
4-pentyloxy-4'-octyloxy-2,3-difluorobiphenyl
K 8.0 S$_A$ 12.0 N 18.0 I
4-heptyloxy-4'-pentyl-2,3-difluorobiphenyl
K 0.5 I
4-nonyloxy-4'-octyloxy-2,3-difluorobiphenyl
K 25.0 (S$_C$ 11.5) S$_A$ 33.0 N 34.0 I 10C 4,4''-Dialkyl-2',3'-difluoro-p-terphenyle 0.1 mol 4-pentyl-2',3'-difluorobiphenyl are deprotaned with n-butyllithium in THF/TMEDA according to example 10A and reacted with 0.1 mol 4-propylcyclohexanon. After oxidation with 0.2 mol of DDQ according to example 10B 4-pentyl-4''-propyl-2',3'-difluoro-p-terphenyl are obtained.

Analogously are obtained
4-ethyl-4''-propyl-2',3'-difluoro-p-terphenyl
4-propyl-4''-propyl-2',3'-difluoro-p-terphenyl K 94 N 133 I
4-butyl-4''-propyl-2',3'-difluoro-p-terphenyl
4-pentyl-4''-propyl-2',3'-difluoro-p-terphenyl
4-hexyl-4''-propyl-2',3'-difluoro-p-terphenyl
4-heptyl-4''-propyl-2',3'-difluoro-p-terphenyl
4-octyl-4''-propyl-2',3'-difluoro-p-terphenyl
4-nonyl-4''-propyl-2',3'-difluoro-p-terphenyl
4-decyl-4''-propyl-2',3'-difluoro-p-terphenyl
4-dodecyl-4''-propyl-2',3'-difluoro-p-terphenyl
4-ethoxy-4''-propyl-2',3'-difluoro-p-terphenyl
4-propoxy-4''-propyl-2',3'-difluoro-p-terphenyl
4-butoxy-4''-propyl-2',3'-difluoro-p-terphenyl
4-pentoxy-4''-propyl-2',3'-difluoro-p-terphenyl
4-hexoxy-4''-propyl-2',3'-difluoro-p-terphenyl
4-heptoxy-4''-propyl-2',3'-difluoro-p-terphenyl
4-octoxy-4''-propyl-2',3'-difluoro-p-terphenyl
4-nonoxy-4''-propyl-2',3'-difluoro-p-terphenyl
4-decoxy-4''-propyl-2',3'-difluoro-p-terphenyl
4-dodecoxy-4''-propyl-2',3'-difluoro-p-terphenyl
4-ethyl-4''-pentyl-2',3'-difluoro-p-terphenyl
4-propyl-4''-pentyl-2',3'-difluoro-p-terphenyl
4-butyl-4''-pentyl-2',3'-difluoro-p-terphenyl
4-pentyl-4''-pentyl-2',3'-difluoro-p-terphenyl K 60,0° N 120,0° I
4-hexyl-4''-pentyl-2',3'-difluoro-p-terphenyl
4-heptyl-4''-pentyl-2',3'-difluoro-p-terphenyl K 36.5 (S$_C$ 24.0) N 110.5 I
4-octyl-4''-pentyl-2',3'-difluoro-p-terphenyl
4-nonyl-4''-pentyl-2',3'-difluoro-p-terphenyl
4-decyl-4''-pentyl-2',3'-difluoro-p-terphenyl
4-dodecyl-4''-pentyl-2',3'-difluoro-p-terphenyl
4-ethoxy-4''-pentyl-2',3'-difluoro-p-terphenyl
4-propoxy-4''-pentyl-2',3'-difluoro-p-terphenyl
4-butoxy-4''-pentyl-2',3'-difluoro-p-terphenyl
4-pentoxy-4''-pentyl-2',3'-difluoro-p-terphenyl
4-hexoxy-4''-pentyl-2',3'-difluoro-p-terphenyl K 53,0° S$_c$ 65,5° N 149,0° I
4-heptoxy-4''-pentyl-2',3'-difluoro-p-terphenyl
4-octoxy-4''-pentyl-2',3'-difluoro-p-terphenyl K 48,5° S$_c$ 95,1° N 141,5° I
4-nonoxy-4''-pentyl-2',3'-difluoro-p-terphenyl
4-decoxy-4''-pentyl-2',3'-difluoro-p-terphenyl
4-dodecoxy-4''-pentyl-2',3'-difluoro-p-terphenyl
4-nonyl-4''-heptyl-2',3'-difluoro-p-terphenyl K 49.0 S$_C$ 77.0 S$_A$ 93.0 N 108.5 I
4-ethyl-4''-octyl-2',3'-difluoro-p-terphenyl
4-propyl-4''-octyl-2',3'-difluoro-p-terphenyl
4-butyl-4''-octyl-2',3'-difluoro-p-terphenyl
4-pentyl-4''-octyl-2',3'-difluoro-p-terphenyl
4-hexyl-4''-octyl-2',3'-difluoro-p-terphenyl
4-heptyl-4''-octyl-2',3'-difluoro-p-terphenyl
4-octyl-4''-octyl-2',3'-difluoro-p-terphenyl
4-nonyl-4''-octyl-2',3'-difluoro-p-terphenyl
4-decyl-4''-octyl-2',3'-difluoro-p-terphenyl
4-dodecyl-4''-octyl-2',3'-difluoro-p-terphenyl
4-ethoxy-4''-octyl-2',3'-difluoro-p-terphenyl
4-propoxy-4''-octyl-2',3'-difluoro-p-terphenyl
4-butoxy-4''-octyl-2',3'-difluoro-p-terphenyl
4-pentoxy-4''-octyl-2',3'-difluoro-p-terphenyl
4-hexoxy-4''-octyl-2',3'-difluoro-p-terphenyl
4-heptoxy-4''-octyl-2',3'-difluoro-p-terphenyl
4-octoxy-4''-octyl-2',3'-difluoro-p-terphenyl
4-nonoxy-4''-octyl-2',3'-difluoro-p-terphenyl
4-decoxy-4''-octyl-2',3'-difluoro-p-terphenyl
4-dodecoxy-4''-octyl-2',3'-difluoro-p-terphenyl
4-nonoxy-4''-ethoxy-2',3'-difluoro-p-terphenyl
4-decoxy-4''-ethoxy-2',3'-difluoro-p-terphenyl
4-dodecoxy-4''-ethoxy-2',3'-difluoro-p-terphenyl
4-ethyl-4''-heptoxy-2',3'difluoro-p-terphenyl
4-butyl-4''-heptoxy-2',3'-difluoro-p-terphenyl
4-hexyl-4''-heptoxy-2',3'-difluoro-p-terphenyl
4-heptyl-4''-heptoxy-2',3'-difluoro-p-terphenyl
4-nonyl-4''-heptoxy-2',3'-difluoro-p-terphenyl
4-dodecyl-4''-heptoxy-2',3'-difluoro-p-terphenyl
4-ethoxy-4''-heptoxy-2',3'-difluoro-p-terphenyl
4-propoxy-4''-heptoxy-2',3'-difluoro-p-terphenyl
4-butoxy-4''-heptoxy-2',3'-difluoro-p-terphenyl
4-pentoxy-4''-heptoxy-2',3'-difluoro-p-terphenyl
4-hexoxy-4''-heptoxy-2',3'-difluoro-p-terphenyl
4-heptoxy-4''-heptoxy-2',3'-difluoro-p-terphenyl
4-octoxy-4''-heptoxy-2',3'-difluoro-p-terphenyl
4-nonoxy-4''-heptoxy-2',3'-difluoro-p-terphenyl
4-decoxy-4''-heptoxy-2',3'-difluoro-p-terphenyl
4-dodecoxy-4''-heptoxy-2',3'-difluoro-p-terphenyl

EXAMPLE 11

4,4'''-Di-n-alkyl-2',3'-difluoro-p-quaterphenyles

4-Pentyl-2',3'-difluorbiphenyl (0.1 mol, prepared according to example 10B) is deprotonated according example 10A and reacted with 0.1 mol of 4-(p-propylphenyl)-cyclohexanone. After oxidation with 0.2 mol of DDQ according to example 10B 4-pentyl-4'''-propyl-2',3'-difluoro-p-quaterphenyl is obtained.

Analogously are obtained
4-ethyl-4'''-propyl-2',3'-difluoro-p-quaterphenyl
4-propyl-4'''-propyl-2',3'-difluoro-p-quaterphenyl
4-butyl-4'''-propyl-2',3'-difluoro-p-quaterphenyl
4-hexyl-4'''-propyl-2',3'-difluoro-p-quaterphenyl
4-heptyl-4'''-propyl-2',3'-difluoro-p-quaterphenyl
4-octyl-4'''-propyl-2',3'-difluoro-p-quaterphenyl
4-nonyl-4'''-propyl-2',3'-difluoro-p-quaterphenyl
4-decyl-4'''-propyl-2',3'-difluoro-p-quaterphenyl
4-dodecyl-4'''-propyl-2',3'-difluoro-p-quaterphenyl
4-ethoxy-4'''-propyl-2',3'-difluoro-p-quaterphenyl
4-propoxy-4'''-propyl-2',3'-difluoro-p-quaterphenyl
4-butoxy-4'''-propyl-2',3'-difluoro-p-quaterphenyl
4-pentoxy-4'''-propyl-2',3'-difluoro-p-quaterphenyl
4-hexoxy-4'''-propyl-2',3'-difluoro-p-quaterphenyl
4-heptoxy-4'''-propyl-2',3'-difluoro-p-quaterphenyl 4-octoxy-4'''-propyl-2',3'-difluoro-p-quaterphenyl
4-nonoxy-4'''-propyl-2',3'-difluoro-p-quaterphenyl
4-decoxy-4'''-propyl-2',3'-difluoro-p-quaterphenyl
4-ethyl-4'''-octyl-2',3'-difluoro-p-quaterphenyl
4-propyl-4'''-octyl-2',3'-difluoro-p-quaterphenyl
4-butyl-4'''-octyl-2',3'-difluoro-p-quaterphenyl
4-pentyl-4'''-octyl-2',3'-difluoro-p-quaterphenyl
4-hexyl-4'''-octyl-2',3'-difluoro-p-quaterphenyl
4-heptyl-4'''-octyl-2',3'-difluoro-p-quaterphenyl
4-octyl-4'''-octyl-2',3'-difluoro-p-quaterphenyl
4-nonyl-4'''-octyl-2',3'-difluoro-p-quaterphenyl
4-decyl-4'''-octyl-2',3'-difluoro-p-quaterphenyl
4-dodecyl-4'''-octyl-2',3'-difluoro-p-quaterphenyl
4-ethoxy-4'''-octyl-2',3'-difluoro-p-quaterphenyl
4-propoxy-4'''-octyl-2',3'-difluoro-p-quaterphenyl
4-butoxy-4'''-octyl-2',3'difluoro-p-quaterphenyl
4-pentoxy-4'''-octyl-2',3'-difluoro-p-quaterphenyl
4-hexoxy-4'''-octyl-2',3'-difluoro-p-quaterphenyl
4-heptoxy-4'''-octyl-2',3'-difluoro-p-quaterphenyl
4-octoxy-4'''-octyl-2',3'-difluoro-p-quaterphenyl
4-nonoxy-4'''-octyl-2',3'-difluoro-p-quaterphenyl
4-decoxy-4'''-octyl-2',3'-difluoro-p-quaterphenyl
4-ethyl-4'''-ethoxy-2',3'-difluoro-p-quaterphenyl
4-propyl-4'''-ethoxy-2',3'-difluoro-p-quaterphenyl
4-butyl-4'''-ethoxy-2',3'-difluoro-p-quaterphenyl
4-pentyl-4'''-ethoxy-2',3'-difluoro-p-quaterphenyl
4-hexyl-4'''-ethoxy-2',3'-difluoro-p-quaterphenyl
4-heptyl-4'''-ethoxy-2',3'-difluoro p quaterphenyl
4-octyl-4'''-ethoxy-2',3'-difluoro-p-quaterphenyl
4-nonyl-4'''-ethoxy-2',3'-difluoro-p-quaterphenyl
4-decyl-4'''-ethoxy-2',3'-difluoro-p-quaterphenyl
4-dodecyl-4'''-ethoxy-2',3'-difluoro-p-quaterphenyl
4-ethoxy-4'''-ethoxy-2',3'-difluoro-p-quaterphenyl
4-propoxy-4'''-ethoxy-2',3'-difluoro-p-quaterphenyl
4-butoxy-4'''-ethoxy-2',3'-difluoro-p-quaterphenyl
4-pentoxy-4'''-ethoxy-2',3'-difluoro-p-quaterphenyl
4-hexoxy-4'''-ethoxy-2',3'-difluoro-p-quaterphenyl
4-heptoxy-4'''-ethoxy-2',3'-difluoro-p-quaterphenyl
4-octoxy-4'''-ethoxy-2',3'-difluoro-p-quaterphenyl
4-nonoxy-4'''-ethoxy-2',3'-difluoro-p-quaterphenyl
4-decoxy-4'''-ethoxy-2',3'-difluoro-p-quaterphenyl
4-ethyl-4'''-heptoxy-2',3'-difluoro-p-quaterphenyl
4-propyl-4'''-heptoxy-2',3'-difluoro-p-quaterphenyl
4-butyl-4'''-heptoxy-2',3'-difluoro-p-quaterphenyl
4-pentyl-4'''-heptoxy-2',3'-difluoro-p-quaterphenyl
4-hexyl-4'''-heptoxy-2',3'-difluoro-p-quaterphenyl
4-heptyl-4'''-heptoxy-2',3'-difluoro-p-quaterphenyl
4-octyl-4'''-heptoxy-2',3'-difluoro-p-quaterphenyl
4-nonyl-4'''-heptoxy-2',3'-difluoro-p-quaterphenyl
4-decyl-4'''-heptoxy-2',3'-difluoro-p-quaterphenyl
4-dodecyl-4'''-heptoxy-2',3'-difluoro-p-quaterphenyl
4-ethoxy-4'''-heptoxy-2',3'-difluoro-p-quaterphenyl
4-propoxy-4'''-heptoxy-2',3'-difluoro-p-quaterphenyl
4-butoxy-4'''-heptoxy-2',3'-difluoro-p-quaterphenyl
4-pentoxy-4'''-heptoxy-2',3'-difluoro-p-quaterphenyl
4-hexoxy-4'''-heptoxy-2',3'-difluoro-p-quaterphenyl
4-heptoxy-4'''-heptoxy-2',3'-difluoro-p-quaterphenyl
4-octoxy-4'''-heptoxy-2',3'-difluoro-p-quaterphenyl
4-nonoxy-4'''-heptoxy-2',3'-difluoro-p-quaterphenyl
4-decoxy-4'''-heptoxy-2',3'-difluoro-p-quaterphenyl

EXAMPLE 12

Preparation of 4,4''-dialkyl-2,3-difluoro-p-terphenyles

12A 1-(2,3-difluorophenyl)-4-(p-alkylphenyl(cyclohex-1-enes

To a mixture of 1,2-difluorobenzene (0.1 mol) and 100 ml THF a mixture of n-butyllithium (0.105 ml) and 60 ml hexane is added at −70° C. After stirring for 6 h a mixture of 4-(p-propylphenyl)-cyclohexanone (0.1 mol) and 50 ml THF is added. After stirring for 2 h, warming to room temperatures, boiling with PTSA as described for 10A and usual work-up 1-(difluorophenyl)-4-(p-propylphenyl)-cyclohex-1-ene is obtained.

Analogously are obtained
1-(2,3-difluorophenyl)-4-(p-ethylphenyl)-cyclohex-1-ene
1-(2,3-difluorophenyl)-4-(p-butylphenyl)-cyclohex-1-ene
1-(2,3-difluorophenyl)-4-(p-pentylphenyl)-cyclohex-1-ene
1-(2,3-difluorophenyl)-4-(p-hexylphenyl)-cyclohex-1-ene
1-(2,3-difluorophenyl)-4-(p-heptylphenyl)-cyclohex-1-ene
1-(2,3-difluorophenyl)-4-(p-octylphenyl)-cyclohex-1-ene
1-(2,3-difluorophenyl)-4-(p-nonylphenyl)-cyclohex-1-ene
1-(2,3-difluorophenyl)-4-(p-decylphenyl)-cyclohex-1-ene
1-(2,3-difluorophenyl)-4-(p-dodecylphenyl)-cyclohex-1-ene
1-(2,3-difluorophenyl)-4-(p-ethoxyphenyl)-cyclohex-1-ene
1-(2,3-difluorophenyl)-4-(p-pentoxyphenyl)-cyclohex-1-ene
1-(2,3-difluorophenyl)-4-(p-octoxyphenyl)-cyclohex-1-ene
1-(2,3-difluorophenyl)-4-(p-dodecyloxyphenyl)-cyclohex-1-ene
1-(2,3-Difluorphenyl)-4-(4-ethylbiphenyl-4'-yl)-cyclohex-1-ene
1-(2,3-Difluorphenyl)-4-(4-pentylbiphenyl-4'-yl)-cyclohex-1-ene
1-(2,3-Difluorphenyl)-4-(4-octylbiphenyl-4'-yl)-cyclohex-1-ene
1-(2,3-Difluorphenyl)-4-(4-dodecylbiphenyl-4'-yl)-cyclohex-1-ene 1-(2,3-Difluorphenyl)-4-(4-pentoxybiphenyl-4'-yl)-cyclohex-1-ene

12B 4''-Alkyl-2,3-difluoro-p-terphenyles 1-(2,3-difluorophenyl)-4-(p-propylphenyl)-cyclohex-1-ene (0.1 mol) are oxidized according to example 9B with DDQ (0.2 mol). After usual work-up 4''-propyl-2,3-difluoro-p-terphenyl, K 121 I., is obtained.

Analogously are obtained:
4''-ethyl-2,3-difluoro-p-terphenyl
4''-butyl-2,3-difluoro-p-terphenyl
4''-pentyl-2,3-difluoro-p-terphenyl
4''-hexyl-2,3-difluoro-p-terphenyl
4''-heptyl-2,3-difluoro-p-terphenyl
4''-octyl-2,3-difluoro-p-terphenyl
4''-nonyl-2,3-difluoro-p-terphenyl
4''-decyl-2,3-difluoro-p-terphenyl
4''-dodecyl-2,3-difluoro-p-terphenyl
4''-ethoxy-2,3-difluoro-p-terphenyl
4''-pentoxy-2,3-difluoro-p-terphenyl
4''-octoxy-2,3-difluoro-p-terphenyl
4''-dodecyloxy-2,3-difluoro-p-terphenyl
4'''-ethyl-2,3-difluoro-p-quaterphenyl
4'''-pentyl-2,3-difluoro-p-quaterphenyl
4'''-octyl-2,3-difluoro-p-quaterphenyl
4'''-dodecyl-2,3-difluoro-p-quaterphenyl
4'''-pentoxy-2,3-difluoro-p-quaterphenyl

12C 4,4″-Dialkyl-2,3-difluoro-p-terphenyles

A solution of n-butyllithium (0.1 mol) in 65 ml of hexane is added to a mixture of 4″-propyl-2,3-difluoro-p-terphenyl (0.1 mol), potassium t-butylate (0.1 mol) and 200 ml of THF at −100° C. After stirring 5 minutes at −100° C. a mixture of brompentane (0.1 mol) and N,N-dimethylpropylene urea (0.1 mol, DMPU) is added. After warming-up to −30° C. and usual work-up 4″-propyl-4-pentyl-2,3-difluoro-p-terphenyl is obtained.

Analogously are obtained
4″-ethyl-4-pentyl-2,3-difluoro-p-terphenyl
4″-propyl-4-pentyl-2,3-difluoro-p-terphenyl
4″-butyl-4-pentyl-2,3-difluoro-p-terphenyl
4″-pentyl-4-pentyl-2,3-difluoro-p-terphenyl
K 80.0 S$_C$ 115.5 S$_A$ 131.5 N 142.0 I
4″-hexyl-4-pentyl-2,3-difluoro-p-terphenyl
4″-heptyl-4-pentyl-2,3-difluoro-p-terphenyl
K 65.5 S$_C$ 117.0 S$_A$ 135.0 N 136.0 I
4″-octyl-4-pentyl-2,3-difluoro-p-terphenyl
4″-nonyl-4-pentyl-2,3-difluoro-p-terphenyl
4″-decyl-4-pentyl-2,3-difluoro-p-terphenyl
4″-dodecyl-4-pentyl-2,3-difluoro-p-terphenyl
4″-ethoxy-4-pentyl-2,3-difluoro-p-terphenyl
4″-pentoxy-4-pentyl-2,3-difluoro-p-terphenyl
4″-hexoxy-4-pentyl-2,3-difluoro-p-terphenyl
K 100.5 S$_C$ 156.5 S$_A$ 166.5 N 171.5 I
4″-octoxy-4-pentyl-2,3-difluoro-p-terphenyl
K 87.5 S$_C$ 155.5 S$_A$ 165.0 N 165.7 I
4″-(4-methylhexyl)-4-pentyl-2,3-difluoro-p-terphenyl
K 71.0 S$_C$ 120.0 N 128.0 I
4″-dodecyloxy-4-pentyl-2,3-difluoro-p-terphenyl
4″-ethyl-4-propyl-2,3-difluoro-p-terphenyl
4″-propyl-4-propyl-2,3-difluoro-p-terphenyl
K 133 N 150 I
4″-butyl-4-propyl-2,3-difluoro-p-terphenyl
4″-pentyl-4-propyl-2,3-difluoro-p-terphenyl
4″-hexyl-4-propyl-2,3-difluoro-p-terphenyl
4″-heptyl-4-propyl-2,3-difluoro-p-terphenyl
4″-octyl-4-propyl-2,3-difluoro-p-terphenyl
4″-nonyl-4-propyl-2,3-difluoro-p-terphenyl
4″-decyl-4-propyl-2,3-difluoro-p-terphenyl
4″-dodecyl-4-propyl-2,3-difluoro-p-terphenyl
4″-ethoxy-4-propyl-2,3-difluoro-p-terphenyl
4″-pentoxy-4-propyl-2,3-difluoro-p-terphenyl
4″-octoxy-4-propyl-2,3-difluoro-p-terphenyl
4″-dodecyloxy-4-propyl-2,3-difluoro-p-terphenyl
4″-ethyl-4-octyl-2,3-difluoro-p-terphenyl
4″-propyl-4-octyl-2,3-difluoro-p-terphenyl
4″-butyl-4-octyl-2,3-difluoro-p-terphenyl
4″-pentyl-4-octyl-2,3-difluoro-p-terphenyl
4″-hexyl-4-octyl-2,3-difluoro-p-terphenyl
4″-heptyl-4-octyl-2,3-difluoro-p-terphenyl
4″-octyl-4-octyl-2,3-difluoro-p-terphenyl
4″-nonyl-4-octyl-2,3-difluoro-p-terphenyl
4″-decyl-4-octyl-2,3-difluoro-p-terphenyl
4″-dodecyl-4-octyl-2,3-difluoro-p-terphenyl
4″-ethoxy-4-octyl-2,3-difluoro-p-terphenyl
4″-pentoxy-4-octyl-2,3-difluoro-p-terphenyl
4″-octoxy-4-octyl-2,3-difluoro-p-terphenyl
4″-dodecyloxy-4-octyl-2,3-difluoro-p-terphenyl
4″-pentyl-4-heptyl-2,3-difluoro-p-terphenyl
K 55.0 S$_C$ 105.5 S$_A$ 130.5 N 135.0 I
4″-propyl-4-nonyl-2,3-difluoro-p-terphenyl
63.0 S$_C$ 84.5 S$_A$ 116.5 N 129.0 I
4″-ethyl-4-dodecyl-2,3-difluoro-p-terphenyl
4″-propyl-4-dodecyl-2,3-difluoro-p-terphenyl
4″-butyl-4-dodecyl-2,3-difluoro-p-terphenyl
4″-pentyl-4-dodecyl-2,3-difluoro-p-terphenyl
4″-hexyl-4-dodecyl-2,3-difluoro-p-terphenyl
4″-heptyl-4-dodecyl-2,3-difluoro-p-terphenyl
4″-octyl-4-dodecyl-2,3-difluoro-p-terphenyl
4″-nonyl-4-dodecyl-2,3-difluoro-p-terphenyl
4″-decyl-4-dodecyl-2,3-difluoro-p-terphenyl
4″-dodecyl-4-dodecyl-2,3-difluoro-p-terphenyl
4″-ethoxy-4-dodecyl-2,3-difluoro-p-terphenyl
4″-pentoxy-4-dodecyl-2,3-difluoro-p-terphenyl
4″-octoxy-4-dodecyl-2,3-difluoro-p-terphenyl
4″-dodecyloxy-4-dodecyl-2,3-difluoro-p-terphenyl
4‴-ethyl-4-propyl-2,3-difluoro-p-terphenyl
4‴-pentyl-4-propyl-2,3-difluoro-p-terphenyl
4‴-octyl-4-propyl-2,3-difluoro-p-terphenyl
4‴-dodecyl-4-propyl-2,3-difluoro-p-terphenyl
4‴-pentoxy-4-propyl-2,3-difluoro-p-terphenyl
4‴-ethyl-4-pentyl-2,3-difluoro-p-terphenyl
4‴-pentyl-4-pentyl-2,3-difluoro-p-terphenyl
4‴-octyl-4-pentyl-2,3-difluoro-p-terphenyl
4‴-dodecyl-4-pentyl-2,3-difluoro-p-terphenyl
4‴-pentoxy-4-pentyl-2,3-difluoro-p-terphenyl
4‴-ethyl-4-octyl-2,3-difluoro-p-terphenyl
4‴-pentyl-4-octyl-2,3-difluoro-p-terphenyl
4‴-octyl-4-octyl-2,3-difluoro-p-terphenyl
4‴-dodecyl-4-octyl-2,3-difluoro-p-terphenyl
4‴-pentoxy-4-octyl-2,3-difluoro-p-terphenyl
4‴-ethyl-4-dodecyl-2,3-difluoro-p-terphenyl
4‴-pentyl-4-dodecyl-2,3-difluoro-p-terphenyl
4‴-octyl-4-dodecyl-2,3-difluoro-p-terphenyl
4‴-dodecyl-4-dodecyl-2,3-difluoro-p-terphenyl
4‴-pentoxy-4-dodecyl-2,3-difluoro-p-terphenyl

EXAMPLE 13

Preparation of 4-alkoxy-4″-alkyl-2,3-difluoro-p-terphenyls 1,2-Difluoro-3-ethoxybenzene (0.2 mol) is deprotonated with n-butyllithium in THF/TMEDA according example 10A and reacted with 4-(p-propyl-phenyl)-cyclohexanone 0.2 mol) according example 10C. After elimination with PTSA according example 10A and oxidation with DDQ 4-ethoxy-4″-propyl-2,3-difluoro-p-terphenyl is obtained.

Analogously are obtained
4-propoxy-4″-propyl-2,3-difluoro-p-terphenyl
4-butoxy-4″-propyl-2,3-difluoro-p-terphenyl
4-pentoxy-4″-propyl-2,3-difluoro-p-terphenyl
4-hexoxy-4″-propyl-2,3-difluoro-p-terphenyl
4-heptoxy-4″-propyl-2,3-difluoro-p-terphenyl
4-octoxy-4″-propyl-2,3-difluoro-p-terphenyl
4-nonoxy-4″-propyl-2,3-difluoro-p-terphenyl
4-decyloxy-4″-propyl-2,3-difluoro-p-terphenyl
4-dodecyloxy-4″-propyl-2,3-difluoro-p-terphenyl
4-ethoxy-4″-pentyl-2,3-difluoro-p-terphenyl
K 105 S$_c$ 135 N 185.1 I
4-propoxy-4″-pentyl-2,3-difluoro-p-terphenyl
4-butoxy-4″-pentyl-2,3-difluoro-p-terphenyl
4-pentoxy-4″-pentyl-2,3-difluoro-p-terphenyl
4-hexoxy-4″-pentyl-2,3-difluoro-p-terphenyl
K 97,5° S$_c$ 145,5° N 166,0° I
4-heptoxy-4″-pentyl-2,3-difluoro-p-terphenyl
4-octoxy-4″-pentyl-2,3-difluoro-p-terphenyl
K 93,5° S$_c$ 144,0° S$_A$ 148,0° N 159,0° I
4-nonoxy-4″-pentyl-2,3-difluoro-p-terphenyl
4-decyloxy-4″-pentyl-2,3-difluoro-p-terphenyl
4-dodecyloxy-4″-pentyl-2,3-difluoro-p-terphenyl
4-ethoxy-4‴-octyl-2,3-difluoro-p-terphenyl 4-propoxy-4''-octyl-2,3-difluoro-p-terphenyl
4-butoxy-4''-octyl-2,3-difluoro-p-terphenyl
4-pentoxy-4''-octyl-2,3-difluoro-p-terphenyl
4-hexoxy-4''-octyl-2,3-difluoro-p-terphenyl
4-heptoxy-4''-octyl-2,3-difluoro-p-terphenyl
4-octoxy-4''-octyl-2,3-difluoro-p-terphenyl
4-nonoxy-4''-octyl-2,3-difluoro-p-terphenyl
4-decyloxy-4''-octyl-2,3-difluoro-p-terphenyl
4-dodecyloxy-4''-octyl-2,3-difluoro-p-terphenyl
4-ethoxy-4''-dodecyl-2,3-difluoro-p-terphenyl
4-propoxy-4''-dodecyl-2,3-difluoro-p-terphenyl
4-butoxy-4''-dodecyl-2,3-difluoro-p-terphenyl
4-pentoxy-4''-dodecyl-2,3-difluoro-p-terphenyl
4-hexoxy-4''-dodecyl-2,3-difluoro-p-terphenyl
4-heptoxy-4''-dodecyl-2,3-difluoro-p-terphenyl
4-octoxy-4''-dodecyl-2,3-difluoro-p-terphenyl
4-nonoxy-4''-dodecyl-2,3-difluoro-p-terphenyl
4-decyloxy-4''-dodecyl-2,3-difluoro-p-terphenyl
4-dodecyloxy-4''-dodecyl-2,3-difluoro-p-terphenyl
4-octoxy-4''-(4-methylhexyl)-2,3-difluoro-p-terphenyl

K 71.0 $S_C$ 120.0 N 128.0 I 4-ethoxy-4''-ethoxy-2,3-difluoro-p-terphenyl
4-propoxy-4''-ethoxy-2,3-difluoro-p-terphenyl
4-butoxy-4''-ethoxy-2,3-difluoro-p-terphenyl
4-pentoxy-4''-ethoxy-2,3-difluoro-p-terphenyl
4-hexoxy-4''-ethoxy-2,3-difluoro-p-terphenyl
4-heptoxy-4''-ethoxy-2,3-difluoro-p-terphenyl
4-octoxy-4''-ethoxy-2,3-difluoro-p-terphenyl
4-nonoxy-4''-ethoxy-2,3-difluoro-p-terphenyl
4-decyloxy-4''-ethoxy-2,3-difluoro-p-terphenyl
4-dodecyloxy-4''-ethoxy-2,3-difluoro-p-terphenyl
4-ethoxy-4''-pentoxy-2,3-difluoro-p-terphenyl
4-propoxy-4''-pentoxy-2,3-difluoro-p-terphenyl
4-butoxy-4''-pentoxy-2,3-difluoro-p-terphenyl
4-pentoxy-4''-pentoxy-2,3-difluoro-p-terphenyl
4-hexoxy-4''-pentoxy-2,3-difluoro-p-terphenyl
4-heptoxy-4''-pentoxy-2,3-difluoro-p-terphenyl
4-octoxy-4''-pentoxy-2,3-difluoro-p-terphenyl
4-nonoxy-4''-pentoxy-2,3-difluoro-p-terphenyl
4-decyloxy-4''-pentoxy-2,3-difluoro-p-terphenyl
4-dodecyloxy-4''-pentoxy-2,3-difluoro-p-terphenyl
4-ethoxy-4''-dodecyloxy-2,3-difluoro-p-terphenyl
4-propoxy-4''-dodecyloxy-2,3-difluoro-p-terphenyl
4-butoxy-4''-dodecyloxy-2,3-difluoro-p-terphenyl
4-pentoxy-4''-dodecyloxy-2,3-difluoro-p-terphenyl
4-hexoxy-4''-dodecyloxy-2,3-difluoro-p-terphenyl
4-heptoxy-4''-dodecyloxy-2,3-difluoro-p-terphenyl
4-octoxy-4''-dodecyloxy-2,3-difluoro-p-terphenyl
4-nonoxy-4''-dodecyloxy-2,3-difluoro-p-terphenyl
4-decyloxy-4''-dodecyloxy-2,3-difluoro-p-terphenyl
4-dodecyloxy-4''-dodecyloxy-2,3-difluoro-p-terphenyl 4-octoxy-4''-pentyl-2,3,2''-trifluoro-p-terphenyl

K 58.0 $S_C$ 61.5 N 119.5 I 4-ethoxy-4'''-propyl-2,3-difluoro-p-quaterphenyl
4-propoxy-4'''-propyl-2,3-difluoro-p-quaterphenyl
4-butoxy-4'''-propyl-2,3-difluoro-p-quaterphenyl
4-pentoxy-4'''-propyl-2,3-difluoro-p-quaterphenyl
4-hexoxy-4'''-propyl-2,3-difluoro-p-quaterphenyl
4-heptoxy-4'''-propyl-2,3-difluoro-p-quaterphenyl
4-octoxy-4'''-propyl-2,3-difluoro-p-quaterphenyl
4-nonoxy-4'''-propyl-2,3-difluoro-p-quaterphenyl
4-decyloxy-4'''-propyl-2,3-difluoro-p-quaterphenyl
4-dodecyloxy-4'''-propyl-2,3-difluoro-p-quaterphenyl
4-ethoxy-4'''-pentyl-2,3-difluoro-p-quaterphenyl
4-propoxy-4'''-pentyl-2,3-difluoro-p-quaterphenyl
4-butoxy-4'''-pentyl-2,3-difluoro-p-quaterphenyl
4-pentoxy-4'''-pentyl-2,3-difluoro-p-quaterphenyl
4-hexoxy-4'''-pentyl-2,3-difluoro-p-quaterphenyl
4-heptoxy-4'''-pentyl-2,3-difluoro-p-quaterphenyl
4-octoxy-4'''-pentyl-2,3-difluoro-p-quaterphenyl
4-nonoxy-4'''-pentyl-2,3-difluoro-p-quaterphenyl
4-decyloxy-4'''-pentyl-2,3-difluoro-p-quaterphenyl
4-dodecyloxy-4'''-pentyl-2,3-difluoro-p-quaterphenyl
4-ethoxy-4'''-octyl-2,3-difluoro-p-quaterphenyl
4-propoxy-4'''-octyl-2,3-difluoro-p-quaterphenyl
4-butoxy-4'''-octyl-2,3-difluoro-p-quaterphenyl
4-pentoxy-4'''-octyl-2,3-difluoro-p-quaterphenyl
4-hexoxy-4'''-octyl-2,3-difluoro-p-quaterphenyl
4-heptoxy-4'''-octyl-2,3-difluoro-p-quaterphenyl
4-octoxy-4'''-octyl-2,3-difluoro-p-quaterphenyl
4-nonoxy-4'''-octyl-2,3-difluoro-p-quaterphenyl
4-decyloxy-4'''-octyl-2,3-difluoro-p-quaterphenyl
4-dodecyloxy-4'''-octyl-2,3-difluoro-p-quaterphenyl
4-ethoxy-4'''-dodecyl-2,3-difluoro-p-quaterphenyl
4-propoxy-4'''-dodecyl-2,3-difluoro-p-quaterphenyl
4-butoxy-4'''-dodecyl-2,3-difluoro-p-quaterphenyl
4-pentoxy-4'''-dodecyl-2,3-difluoro-p-quaterphenyl
4-hexoxy-4'''-dodecyl-2,3-difluoro-p-quaterphenyl
4-heptoxy-4'''-dodecyl-2,3-difluoro-p-quaterphenyl
4-octoxy-4'''-dodecyl-2,3-difluoro-p-quaterphenyl
4-nonoxy-4'''-dodecyl-2,3-difluoro-p-quaterphenyl
4-decyloxy-4'''-dodecyl-2,3-difluoro-p-quaterphenyl
4-dodecyloxy-4'''-dodecyl-2,3-difluoro-p-quaterphenyl
4-ethoxy-4'''-ethoxy-2,3-difluoro-p-quaterphenyl
4-propoxy-4'''-ethoxy-2,3-difluoro-p-quaterphenyl
4-butoxy-4'''-ethoxy-2,3-difluoro-p-quaterphenyl
4-pentoxy-4'''-ethoxy-2,3-difluoro-p-quaterphenyl
4-hexoxy-4'''-ethoxy-2,3-difluoro-p-quaterphenyl
4-heptoxy-4'''-ethoxy-2,3-difluoro-p-quaterphenyl
4-octoxy-4'''-ethoxy-2,3-difluoro-p-quaterphenyl
4-nonoxy-4'''-ethoxy-2,3-difluoro-p-quaterphenyl
4-decyloxy-4'''-ethoxy-2,3-difluoro-p-quaterphenyl
4-dodecyloxy-4'''-ethoxy-2,3-difluoro-p-quaterphenyl
4-ethoxy-4'''-pentoxy-2,3-difluoro-p-quaterphenyl
4-propoxy-4'''-pentoxy-2,3-difluoro-p-quaterphenyl
4-butoxy-4'''-pentoxy-2,3-difluoro-p-quaterphenyl
4-pentoxy-4'''-pentoxy-2,3-difluoro-p-quaterphenyl
4-hexoxy-4'''-pentoxy-2,3-difluoro-p-quaterphenyl
4-heptoxy-4'''-pentoxy-2,3-difluoro-p-quaterphenyl
4-octoxy-4'''-pentoxy-2,3-difluoro-p-quaterphenyl
4-nonoxy-4'''-pentoxy-2,3-difluoro-p-quaterphenyl
4-decyloxy-4'''-pentoxy-2,3-difluoro-p-quaterphenyl
4-dodecyloxy-4'''-pentoxy-2,3-difluoro-p-quaterphenyl
4-ethoxy-4'''-dodecyloxy-2,3-difluoro-p-quaterphenyl
4-propoxy-4'''-dodecyloxy-2,3-difluoro-p-quaterphenyl
4-butoxy-4'''-dodecyloxy-2,3-difluoro-p-quaterphenyl
4-pentoxy-4'''-dodecyloxy-2,3-difluoro-p-quaterphenyl
4-hexoxy-4'''-dodecyloxy-2,3-difluoro-p-quaterphenyl
4-heptoxy-4'''-dodecyloxy-2,3-difluoro-p-quaterphenyl
4-octoxy-4'''-dodecyloxy-2,3-difluoro-p-quaterphenyl
4-nonoxy-4'''-dodecyloxy-2,3-difluoro-p-quaterphenyl
4-decyloxy-4'''-dodecyloxy-2,3-difluoro-p-quaterphenyl 4-dodecyloxy-4'''-dodecyloxy-2,3-difluoro-p-quaterphenyl

EXAMPLE 14

Ferroelectric smectic C liquid crystal mixtures containing difluoroterphenyls.

Mixture 14A

| | |
|---|---|
| 4-n-octyloxy-2,3-difluoro-4''-n-pentyl-p-terphenyl | 95 wt % |
| (+)-(1-cyano-2-methylpropyl)-4'-octyloxybiphenyl-4-ylcarboxylate | 5 wt % |

The optically active compound in this mixture is of L configuration.

The mixture showed the liquid crystal transitions (°C.) K 85.9 $S_C$ 125.4 $S_A$ 143.2 N 150.6 I The $S_C$ phase supercooled to 76° C.

| Temp (°C.) | Ps (nCcm$^{-2}$) | $S_C$ tilt (°) |
|---|---|---|
| 125 | 4.0 | 16.0 |
| 122 | 6.6 | |
| 120 | 7.8 | 18.0 |
| 115 | 9.8 | |
| 113 | 10.6 | |
| 110 | 11.4 | 22.5 |
| 105 | 13.1 | |
| 100 | 14.6 | 25 |
| 95 | 16.0 | 27 |
| 90 | 16.9 | 28 |
| 87 | 17.6 | |
| 85 | 18.1 | |
| 82 | 18.8 | |
| 80 | 19.0 | |
| 130 | | 1.0 |

Mixture 14B

| | |
|---|---|
| 4-n-hexyloxy-4''-pentyl-2'3'-difluoro-p-terphenyl | 45 wt % |
| 4-n-octyloxy-4''-pentyl-2',3'-difluoro-p-terphenyl | 45 wt % |
| (+)-(1-cyano-2-methylpropyl)-4'-octyloxybiphenyl-4-ylcarboxylate | 6.25 wt % |
| (−)-(1-cyano-2-methylpropyl)-4'-octyloxybiphenyl-4-ylcarboxylate | 3.75 wt % |

The mixture showed the following liquid crystal transitions (°C.):

>20 $S_C$ 84.7 $S_A$ 98.6 N 128 I i.e. the mixture showed a room temperature $S_C$ phase.

| Temp (°C.) | Ps (nCcm$^{-2}$) | $S_C$ tilt (°) |
|---|---|---|
| 84 | 0.12 | |
| 82 | 1.12 | 9.0 |
| 80 | 2.0 | 10.0 |
| 75 | 2.93 | 14.0 |
| 70 | 3.75 | 15.0 |
| 65 | 4.32 | |
| 60 | 4.87 | 18.0 |
| 55 | 5.4 | |
| 50 | 5.83 | 20.0 |
| 45 | 6.4 | |
| 40 | 6.9 | 22.5 |
| 35 | 7.28 | 22.5 |
| 30 | 7.74 | 23.5 |
| 25 | 8.08 | |

Using a liquid crystal electro-optic cell of well known construction, mixture 14B showed a switching time of about 100 μsec with a 20 V applied voltage, and a 2 μm spaced cell with polyimide alignment films.

EXAMPLE 15

A 1:1 by weight mixture of:
4-n-hexyloxy-4''-n-pentyl-2',3'-difluoro-p-terphenyl
and
4-n-octyloxy-4''-n-pentyl-2',3'-difluoro-p-terphenyl
showed an $S_C$ phase which supercooled to 28° C., $S_C$ 79.1 N 142.4 I. The birefringence of the mixture was 0.19.

EXAMPLE 16

A mixture is formulated containing the following liquid crystalline components:

| | |
|---|---|
| 4-octyl-4''-propyl-2'-fluoro-p-terphenyl | 29.45% |
| 4-heptyl-4''-propyl-2'-fluoro-p-terphenyl | 19.80% |
| L-(−)-4-hexoxy-4''-(2-methylbutyl)-2'-fluoro-p-terphenyl | 29.40% |
| S-(+)-2-octyl 4'-octoxybiphenyl-4-ylcarboxylate | 6.45% |
| 4-octoxy-4''-pentyl-2',3'-difluoro-p-terphenyl | 5.00% |

EXAMPLE 17

A mixture is formulated containing the following liquid crystalline components:

| | |
|---|---|
| 4-octyl-4''-propyl-2'-fluoro-p-terphenyl | 41.55% |
| L-(−)-4-hexoxy-4''-(2-methylbutyl)-2'-fluoro-p-terphenyl | 41.75% |
| S-(+)-2-octyl 4'-octoxybiphenyl-4-ylcarboxylate | 11.70% |
| 4-octoxy-4''-pentyl-2,3-difluoro-p-terphenyl | 5.00% |

EXAMPLE 18

A mixture is formulated containing the following liquid crystalline components:

| | |
|---|---|
| 4-octyl-4''-pentyl-2'-fluoro-p-terphenyl | 72.00% |
| S-(+)-2-octyl 4'-octoxybiphenyl-4-ylcarboxylate | 4.50% |
| 2-fluor-4-pentylphenyl 4-octoxybenzoate | 13.50% |
| 4-octoxy-4''-pentyl-2,3-difluoro-p-terphenyl | 5.00% |
| 4-octoxy-4''-pentyl-2',3'-difluoro-p-terphenyl | 5.00% |

EXAMPLE 19

A mixture for ECB-application formulated containing the following liquid crystalline components:

| | |
|---|---|
| 4,4'-dipropyl-2,3-difluorobiphenyl | 20% |
| 4,4'-dipentyl-2,3-difluorobiphenyl | 20% |
| 4,4''-dipropyl-2,3-difluoro-p-terphenyl | 20% |
| 4-(trans-4-propylcyclohexyl)-methoxybenzene | 15% |
| 4-(trans-4-propylcyclohexyl)-ethoxybenzen | 15% |
| 4,4'-bis-(trans-4-propylcyclohexyl)-2-fluorobiphenyl | 4% |
| 4-ethyl-4'-methoxytolane | 3% |
| 4-methoxy-4'-methyltolane | 3% | exhibits clearing point 86° C., Δε −1.5, Δn +0.185.

EXAMPLE 20

A mixture for ECB-application formulated containing the following liquid crystalline components:

| | |
|---|---|
| 4-propyloxy-4'-propyl-2,3-difluorobiphenyl | 15% |

-continued

| | |
|---|---|
| 4-pentyloxy-4'-pentyl-2,3-difluorobiphenyl | 15% |
| 4-pentyl-4''-hexyloxy-2',3'-difluoro-p-terphenyl | 15% |
| 4-pentyl-4''-octyloxy-2',3'-difluoro-p-terphenyl | 15% |
| 4-(trans-4-propylcyclohexyl)-methoxybenzene | 15% |
| 4-(trans-4-propylcyclohexyl)-ethoxybenzene | 15% |
| 4,4'-bis-(trans-4-propylcyclohexyl)-2-fluorobiphenyl | 4% |
| 4,4'-bis-(trans-4-pentylcyclohexyl)-2-fluorobiphenyl | 3% |
| 4-(trans-4-propylcyclohexyl)-4'-(trans-pentylcyclohexyl)-2-fluorobiphenyl | 3% | exhibits clearing point 82° C., $\Delta\epsilon$ −1.7, $\Delta n$ +0.17.

EXAMPLE 21

A mixture for ECB-application formulated containing the following liquid crystalline components:

| | |
|---|---|
| 4-propyloxy-4'-propyl-2,3-difluorobiphenyl | 15% |
| 4-pentyloxy-4'-pentyl-2,3-difluorobiphenyl | 15% |
| 4-pentyl-4''-hexyloxy-2,3'-difluoro-p-terphenyl | 15% |
| 4-pentyl-4''-octyloxy-2,3'-difluoro-p-terphenyl | 15% |
| 4-(trans-4-propylcyclohexyl)-methoxybenzene | 17% |
| 4-ethyl-4'-methoxytolane | 4% |
| 4-ethoxy-4'-methyltolane | 4% |
| 4-(trans-4-propylcyclohexyl)-4'-methoxytolane | 5% |
| 4-(trans-4-propylcyclohexyl)-4-ethoxytolane | 5% |
| 4-(trans-4-propylcyclohexyl)-4'-propoxytolane | 5% | exhibits clearing point 91° C., $\Delta\epsilon$ −1.5, $\Delta n$ +0.23.

EXAMPLE 22

Ferroelectric mixtures are formulated containing difluoroterphenyls based on a eutectic host (Host I) which contains

| | |
|---|---|
| 4-hexyloxy-4''-pentyl-2',3'-difluor-p-terphenyl | 37.25 wt % |
| 4-hexyloxy-4''-pentyl-2,3-difluor-p-terphenyl | 13.60 wt % |
| 4-octyloxy-4''-pentyl-2',3'-difluor-p-terphenyl | 40.8 wt % |
| 4-octyloxy-4''-pentyl-2,3-difluor-p-terphenyl | 8.35 wt % |

Mixture 22A

| | |
|---|---|
| Host I | 70 wt % |
| 4-octyloxy-4'-pentyl-2,3-difluorobiphenyl | 20 wt % |
| (+)-(1-cyano-2-methylpropyl)-4'-octyloxy-biphenyl-4-yl-carboxylate | 6.25 wt % |
| (−)-(1-cyano-2-methylpropyl)-4'-octyloxy-biphenyl-4-yl-carboxylate | 3.75 wt % |

$S_C$ 60 $S_A$ 79.7 N 109.4 I and $P_S$ 6.6 nC/cm² (at 30° C.), $S_C$ tilt angle 21.5°. The mixture exhibits a switching time of about 40 μsec using an electrooptic cell of Example 14.

Mixture 22B

| | |
|---|---|
| Host I | 90 wt % |
| (+)-(1-cyano-2-methylpropyl)-4'-octyloxy-biphenyl-4-yl-carboxylate | 6.75 wt % |
| (−)-(1-cyano-2-methylpropyl)-4'-octyloxy-biphenyl-4-yl-carboxylate | 3.75 wt % |

K<20 $S_C$ 90.4 $S_A$ 109.6 N 133 I, $P_S$ 8.9 nC/cm² (at 30° C.), $S_C$ tilt angle 23.5, switching time about 90 μsec.

Mixture 22C

| | |
|---|---|
| Host I | 90 wt % |
| (+)-(1-cyano-2-methylpropyl)-4'-octyloxy-biphenyl-4-yl-carboxylate | 5.63 wt % |
| (−)-(1-cyano-2-methylpropyl)-4'-octyloxy-biphenyl-4-yl-carboxylate | 4.37 wt % |

$S_C$ 93 $S_A$ 109.6 N 133 I, $P_S$ 4.24 nC/cm² (at 30° C.), $S_C$ tilt angle 23.5°, switching time about 260 μsec.

Mixture 22D

| | |
|---|---|
| Host I | 70 wt % |
| 4-octyloxy-4'-pentyl-2,3-difluorobiphenyl | 20 wt % |
| (+)-(1-cyano-2-methylpropyl)-4'-octyloxy-biphenyl-4-yl-carboxylate | 5.63 wt % |
| (−)-(1-cyano-2-methylpropyl)-4'-octyloxy-biphenyl-4-yl-carboxylate | 4.37 wt % |

$S_C$ 60 $S_A$ 79.7 N 109.4 I, $P_S$ 2.7 nC/cm² (at 30° C.), $S_C$ twist angle 19.5°, switching time about 75 μsec.

Mixture 22E

| | |
|---|---|
| Host I | 45 wt % |
| 4,4''-dipentyl-2',3'-difluoro-p-terphenyl | 45 wt % |
| (+)-(1-cyano-2-methylpropyl)-4'-octyloxy-biphenyl-4-yl-carboxylate | 6.25 wt % |
| (−)-(1-cyano-2-methylpropyl)-4'-octyloxy-biphenyl-4-yl-carboxylate | 3.75 wt % |

$S_C$ 60.5 $S_A$ 87.1 N 114.7 I, $P_S$ 5.6 nC/cm², $S_C$ twist angle 22°, switching time 54 μsec.

EXAMPLE 23

Ferroelectric mixtures are formulated containing difluoroterphenyls based on a host (Host II) which contains

| | |
|---|---|
| 4-heptyl-5''-pentyl-2,3-difluor-p-terphenyl | 33.33 wt % |
| 4',4''-dipentyl-2,3-difluor-p-terphenyl | 33.33 wt % |
| 4',4''-dipentyl-2',3'-difluor-p-terphenyl | 33.33 wt % |

Mixture 23A

| | |
|---|---|
| Host II | 90.00 wt % |
| (+)-(1-cyano-2-methylpropyl)-4'-octyloxy-biphenyl-4-yl-carboxylate | 6.25 wt % |
| (−)-(1-cyano-2-methylpropyl)-4'-octyloxy-biphenyl-4-yl-carboxylate | 3.75 wt % |

$S_C$ 60 $S_A$ 105 N 115 I, $P_S$ 7.2 nC/cm² (at 30° C.), $S_C$ twist angle 21.5°, switching time 17 μsec.

Mixture 23B

| | |
|---|---|
| Host II | 90.00 wt % |
| (+)-(1-cyano-2-methylpropyl)-4'-octyloxy-biphenyl-4-yl-carboxylate | 10.00 wt % |

$S_C$ 59 $S_A$ 105.4 N 116 I $P_S$ 30 nC/cm² (at 30° C.), $S_C$ twist angle 21.5°, switching time 4 μsec.

Mixture 23C

| | |
|---|---|
| Host II | 97.5 wt % |
| (+)-(1-cyano-2-methylpropyl)-4'-octyloxy-biphenyl-4-yl-carboxylate | 2.5 wt % |

$S_C$ 86.7 $S_A$ 107.1 N 124.7 I, $P_S$ 7.0 nC/cm² (at 30° C.), $S_C$ twist ablge 23°, switching time about 70 μsec.

EXAMPLE 24

Ferroelectric mixtures are formulated containing different amounts of difluorterphenyls and chiral dopants.

Mixture 24A

| | |
|---|---|
| 4-heptyl-4''-nonyl-2,3-difluor-p-terphenyl | 97.5 wt % |
| (+)-(1-cyano-2-methylpropyl)-4'-octyloxy-biphenyl-4-yl-carboxylate | 2.5 wt % |

K 48 $S_C$ 62.6 $S_A$ 92.5 N 103.8 I, $P_S$ 2.9 (at 50° C.), switching time 15 μsec.

Mixture 24B

| | |
|---|---|
| 4-pentyl-4''-(4-methylhexyl)-2,3-difluoro-p-terphenyl | 90 wt % |
| (+)-(1-cyano-2-methylpropyl)-4'-octyloxy-biphenyl-4-yl-carboxylate | 6.2 wt % |
| (−)-(1-cyano-2-methylpropyl)-4'-octyloxy-biphenyl-4-yl-carboxylate | 3.8 wt % |

K 56.1 $S_C$ 80.2 $S_A$ 82.7 N 89.4 I, $S_C$ twist angle 26°.

Mixture 24C

| | |
|---|---|
| 4-pentyl-4''-heptyl-2',3'-difluor-p-terphenyl | 29.25 wt % |
| 4-heptyl-4''-nonyl-2',3'-difluor-p-terphenyl | 34.125 wt % |
| 4-heptyl-4''-pentyl-2,3-difluor-p-terphenyl | 19.50 wt % |
| 4-pentyl-4''-heptyl-2,3-difluor-p-terphenyl | 14.625 wt % |
| (+)-1-cyano-2-methylpropyl)-4'-octyloxy-biphenyl-4-yl-carboxylate | 2.50 wt % |

$S_C$ 68 $S_A$ 94.2 N 111 I, $P_S$ 5.9 nC/cm² (at 30° C.), $S_C$ twist angle 22.5°, switching time about 40 μsec.

Mixture 24D

| | |
|---|---|
| 4,4''-dipentyl-2',3'-difluoro-p-terphenyl | 45 wt % |
| 4,4''-dipentyl-2,3-difluoro-p-terphenyl | 22.5 wt % |
| 4-heptyl-4''-pentyl-2,3-difluoro-p-terphenyl | 22.5 wt % |
| (+)-1-cyano-2-methylpropyl)-4'-octyloxy-biphenyl-4-yl-carboxylate | 6.2 wt % |
| (−)-1-cyano-2-methylpropyl)-4'-octyloxy-biphenyl-4-yl-carboxylate | 3.8 wt % |

$S_C$ 43.6 $S_A$ 95.5 N 109.5 I, $P_S$ 5.1 nC/cm² (at 25° C.).

Mixture 24E

| | |
|---|---|
| 4-heptyl-4''-pentyl-2',3'-difluoro-p-terphenyl | 48.5 wt % |
| 4-heptyl-4''-pentyl-2,3-difluoro-p-terphenyl | 24.25 wt % |
| 4,4''-dipentyl-2,3-difluoro-p-terphenyl | 24.25 wt % |
| (+)-1-cyano-2-methylpropyl)-4'-octyloxy-biphenyl-4-yl-carboxylate | 3.0 wt % |

$S_C$ 75 $S_A$ 91 N 116 I, $P_S$ 7.9 nC/cm² (at 30° C.), $S_C$ twist angle 23°.

We claim:

1. A chiral tilted smectic liquid crystalline composition comprising at least two liquid crystalline compounds, wherein at least one compound is a terphenyl of formula I:

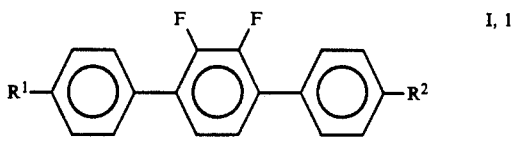

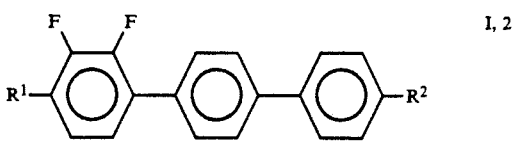

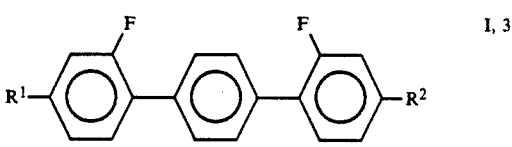

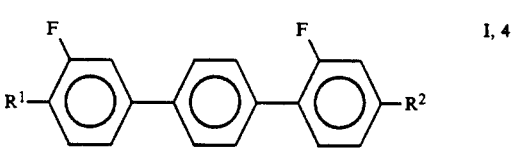

in which the terminal substituents $R^1$, $R^2$ and $R^3$ are each independently an alkyl or alkenyl residue each with up to 15 C atoms, optionally substituted by CN or by at least one halogen atom, and wherein one or more non-adjacent CH₂ groups of these residues may be replaced by —O—, —S—, —CO—, —O—CO—, —CO—O—, —O—CO—O or —C≡C—, one of the residues $R^1$ and $R^2$ may also denote a group of the formula

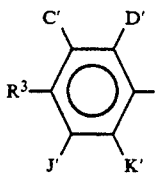

any one of the following pairs of lateral substituents are both fluorine: (C'', D') are both fluorine, all of the other lateral substituents being hydrogen or fluorine.

2. A composition of claim 1 wherein the terminal substituents $R^1$ and $R^2$ or $R^3$ and one of the residues of $R^1$ and $R^2$ are independently alkoxy, alkyl, perfluoroalkyl or perfluoroalkoxy each with up to 15 C atoms.

3. A liquid crystalline composition according to claim 1 comprising at least one compound of formula I and at least one compound of formula:

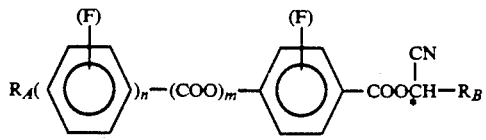

wherein $R_A$ is $C_{5-12}$-alkyl or $C_{5-12}$-alkoxy, $R_B$ is $C_1-C_4$ n-alkyl, cyclohexyl or a branched or chiral alkyl of the formula

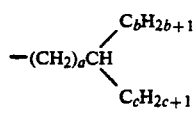

where a is 0 or 1-6, and each of b and c are independently 1-6, and (F) indicates that the ring may carry a lateral fluoro-substituent, n is 1 or 2, m is 0 or 1.

4. A liquid crystalline display element, comprising a liquid crystalline phase according to claim 1.

5. An electro-optical display element, comprising a liquid crystalline phase according to claim 1.

6. A composition containing a compound of formula I'

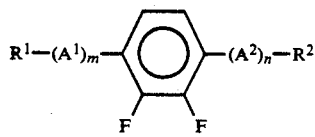

I' wherein
- $A^1$ and $A^2$ are each independently a 1,4-phenylene group optionally substituted by one to four fluorines,
- $R^1$ and $R^2$ are each independently an alkyl or alkenyl residue each with up to 15 C atoms, optionally substituted by CN or by at lease one halogen atom, and wherein one or more non-adjacent $CH_2$ groups of these residues may be replaced by —O—, —S—, —CO—, —O—CO—, —CO—O—, —O—CO—O— or —C≡C—,
- m is 0 or 1,
- n is 1, 2 or 3, and
- the sum of m and n is 2 or 3.

7. A composition comprising a p-terphenyl of claim 6, wherein the sum of m and n is 2.

8. A chiral tilted smectic composition comprising at least two LC comopunds, wherein at least one compound is a biphenyl compound of the formula

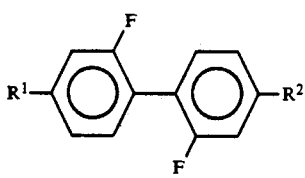
I,14

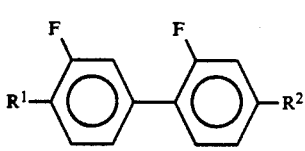
I,16

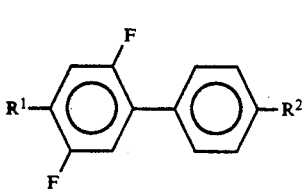
I,17

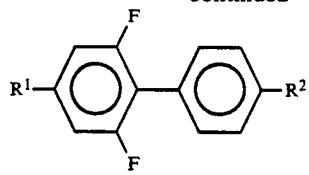
I,18 or

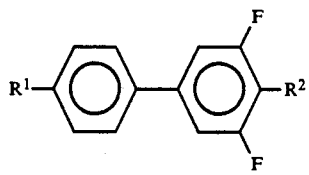
I,19 in which the terminal substituents
$R^1$, $R^2$ and $R^3$ are each independently an alkyl or alkenyl residue each with up to 15 C atoms, optionally substituted by CN or by at least one halogen atom, and wherein one or more non-adjacent $CH_2$ groups of these residues may be replaced by —O—, —S—, —CO—, —O—CO—, —CO—O—, —O—CO—O or —C≡C—, one of the residues $R^1$ and $R^2$ may also denote a group of the formula,

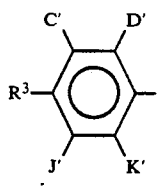

any one of the following pairs of lateral substituents are both fluorine: (C'', D') are both fluorine, all of the other lateral substituents being hydrogen or fluorine.

9. A compound of the formula:

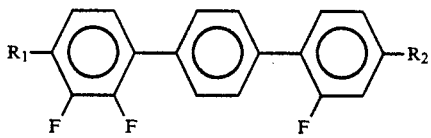

in which the terminal substituents
$R^1$, $R^2$ and $R^3$ are each independently an alkyl or alkenyl residue each with up to 15 C atoms, optionally substituted by CN or by at least one halogen atom, and wherein one or more non-adjacent $CH_2$ groups of these residues may be replaced by —O—, —S—, —CO—, —O—CO—, —CO—O—, —O—CO—O or —C≡C—, one of the residues $R^1$ and $R^2$ may also denote a group of the formula,

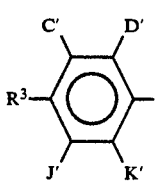

any one of the following pairs of lateral substituents are both fluorine: (C'', D') are both fluorine, all of the other lateral substituents being hydrogen or fluorine.

10. A compound of claim 9 wherein the terminal substituents are each independently n-alkyl or n-alkoxy with 5 to 12 carbon atoms.

11. A compound of claim 10, wherein at least one terminal substituent is a chiral alkyl or alkoxy group with 5 to 12 carbon atoms.

12. An electro-optical display element based on the ECB effect, containing a liquid crystalline phase, which has a negative dielectric anisotropy, comprising at least one liquid crystalline component is a compound of formula I′

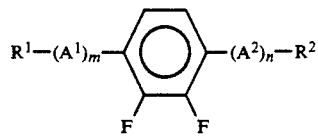

wherein
A$^1$ and A$^2$ are each independently a 1,4-phenylene group optionally substituted by one to four fluorines,
R$^1$and R$^2$ are each independently an alkyl or alkenyl residue each with up to 15 C atoms, optionally substituted by CN or by at lease one halogen atom, and wherein one or more non-adjacent CH$_2$ groups of these residues may be replaced by —O—, —S—, —CO—, —O—CO—, —CO—O—, —O—CO—O— or —C≡C—,
m is 0 or 1,
n is 1, 2 or 3, and
the sum of m and n is 2 or 3.

13. An electro-optical display element of claim 12, wherein the sum of m and n is 2.

14. An electro-optical display element of claim 13, wherein the terminal substituents are each independently n-alkyl or alkoxy with 1 to 7 carbon atoms.

* * * * *